United States Patent
Kushibe

(10) Patent No.: US 11,809,147 B2
(45) Date of Patent: Nov. 7, 2023

(54) OPTIMIZATION DEVICE, METHOD FOR CONTROLLING OPTIMIZATION PROCESSING, AND NON-TRANSITORY COMPUTER-READABLE STORAGE MEDIUM FOR STORING PROGRAM FOR CONTROLLING OPTIMIZATION PROCESSING

(71) Applicant: FUJITSU LIMITED, Kawasaki (JP)

(72) Inventor: Daisuke Kushibe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 429 days.

(21) Appl. No.: 16/892,523

(22) Filed: Jun. 4, 2020

(65) Prior Publication Data

US 2020/0393798 A1     Dec. 17, 2020

(30) Foreign Application Priority Data

Jun. 17, 2019 (JP) .................................. 2019-112367

(51) Int. Cl.
*G06N 7/00* (2023.01)
*G06N 5/00* (2023.01)
(Continued)

(52) U.S. Cl.
CPC ......... *G05B 13/041* (2013.01); *G05B 13/042* (2013.01); *G06N 7/01* (2023.01); *G06N 7/08* (2013.01)

(58) Field of Classification Search
CPC ........... G06N 7/005; G06N 7/08; G06N 5/003
See application file for complete search history.

(56) References Cited

U.S. PATENT DOCUMENTS

2003/0084155 A1 * 5/2003 Graupner .................. H04L 9/40
                                                     709/226
2015/0269124 A1 * 9/2015 Hamze .................... G06N 20/00
                                                     703/2
(Continued)

FOREIGN PATENT DOCUMENTS

JP      2018-005541 A   1/2018
JP        6465231 B1    2/2019

OTHER PUBLICATIONS

Sanroku Tsukamoto et al.,"An Accelerator Architecture for Combinatorial Optimization Problems", FUJITSU Sci. Tech. J., vol. 53, No. 5, pp. 8-13, Sep. 2017, (Total 6 pages).

(Continued)

*Primary Examiner* — Kuen S Lu
(74) *Attorney, Agent, or Firm* — Fujitsu Patent Center

(57) ABSTRACT

A method for controlling an optimization device, the method comprising: obtaining a value of a state variable included in an evaluation function obtained by converting a problem stored in a storage unit; and performing a search for a minimum value of the evaluation function by repeating a process of updating the value of the state variable by a Markov chain Monte Carlo method based on a transition probability distribution that is represented by a function by which it is possible to normalize to one a sum of probabilities of transition from a current state represented by a current value of the state variable to each of a plurality of different states, in which a transition probability becomes larger than in a Boltzmann distribution as a change in the value of the evaluation function due to a change in the value of the state variable is positively larger.

12 Claims, 30 Drawing Sheets

(51) Int. Cl.
  *G06N 7/08*   (2006.01)
  *G05B 13/04*  (2006.01)
  *G06N 7/01*   (2023.01)

(56) References Cited

U.S. PATENT DOCUMENTS

| | | |
|---|---|---|
| 2018/0005114 A1 | 1/2018 | Tomita et al. |
| 2018/0204111 A1* | 7/2018 | Zadeh .................... G06N 3/043 |
| 2019/0278829 A1 | 9/2019 | Takatsu |
| 2020/0160046 A1* | 5/2020 | Andreou ................. G01S 15/86 |
| 2020/0272910 A1* | 8/2020 | Kapit ..................... G06N 10/00 |

OTHER PUBLICATIONS

S. Kirkpatrick et al., "Optimization by Simulated Annealing", Science, vol. 220, No. 4598, May 13, 1983, pp. 671-680 (Total 12 pages).

Constantino Tsallis et al., "Generalized Simulated Annealing", Physica A 233 (1996), pp. 395-406, 1996 Elsevier Science (Total 12 pages).

Koji Hukushima et al., "Exchange Monte Carlo Method and Application to Spin Glass Simulations", Journal of the Physical Society of Japan, vol. 65, No. 6, Jun. 1996, pp. 1604-1608 (Total 5 pages).

* cited by examiner

FIG. 19

EVALUATION VALUE CALCULATION RESULT

| T | | $E_{min}$ | $E_{ave}$ | $E_{stddev}$ | $dE_{ave}$ | $dE_{stddev}$ |
|---|---|---|---|---|---|---|
| FIRST RANK | 1 | 106.035 | 315.674 | 396.122 | 158.099 | 198.214 |
| SECOND RANK | 2 | 117.842 | 475.770 | 583.078 | 169.863 | 220.405 |
| THIRD RANK | 3 | 146.486 | 576.790 | 702.593 | 180.577 | 237.860 |
| FOURTH RANK | 4 | 311.081 | 703.633 | 857.407 | 182.025 | 244.807 |
| FIFTH RANK | 5 | 321.014 | 851.771 | 1037.816 | 194.932 | 264.448 |
| SIXTH RANK | 6 | 125.668 | 953.807 | 1175.541 | 195.549 | 271.939 |
| SEVENTH RANK | 7 | 512.183 | 1032.869 | 1248.747 | 207.347 | 287.443 |
| EIGHTH RANK | 8 | 527.136 | 1091.644 | 1306.815 | 203.648 | 286.356 |
| NINTH RANK | 9 | 522.678 | 1203.991 | 1467.740 | 214.579 | 302.829 |
| TENTH RANK | 10 | 542.175 | 1285.801 | 1552.652 | 220.587 | 310.937 |

24a

OPTIMIZATION DEVICE, METHOD FOR CONTROLLING OPTIMIZATION PROCESSING, AND NON-TRANSITORY COMPUTER-READABLE STORAGE MEDIUM FOR STORING PROGRAM FOR CONTROLLING OPTIMIZATION PROCESSING

CROSS-REFERENCE TO RELATED APPLICATION

This application is based upon and claims the benefit of priority of the prior Japanese Patent Application No. 2019-112367, filed on Jun. 17, 2019, the entire contents of which are incorporated herein by reference.

FIELD

The embodiments discussed herein are related to an optimization device, a method for controlling an optimization processing, and a non-transitory computer-readable storage medium storing a program for controlling the optimization processing.

BACKGROUND

A problem that frequently occurs in natural sciences and social sciences is a minimum value solution problem (or also called a combinatorial optimization problem) that finds the minimum value of an evaluation function (or also called an energy function) (or that finds a combination of values of state variables of an evaluation function that gives the minimum value). In recent years, movement to formulate such a problem with an Ising model, which is a model representing the behaviors of spins of a magnetic material, has been accelerated. A technical basis of this movement is realization of an Ising-type quantum computer. The Ising-type quantum computer is expected to be capable of solving, in a realistic time, multivariable combinatorial optimization problems that Neumann-type computers are inapt at. On the other hand, an optimization device in which an Ising-type computer is implemented by an electronic circuit has been developed.

As a calculation method for the minimum value solution problem using an Ising model, there is a method of searching for a minimum value of an Ising-type energy function using a Markov chain Monte Carlo method (hereinafter, referred to as an MCMC method or an MCMC calculation). In the MCMC calculation, it is common to update state variables of the energy function (state transition) with a transition probability according to a Boltzmann distribution. However, the energy function includes many local minima that are local solutions, and once a solution is captured by a local solution, a probability of escape from the local solution is very low. To facilitate escape from the local solution, techniques such as a simulated annealing method (hereinafter abbreviated as SA method) and a replica exchange method (also called an extended ensemble method or the like) are known.

The SA method is a method such that the value of a temperature parameter included in an equation that determines the transition probability is gradually reduced according to a predetermined schedule (which is equivalent to lowering the temperature), to thereby finally obtain the minimum value of the energy function. The replica exchange method is a technique to set a different value of a temperature parameter for each of a plurality of replicas, perform the MCMC calculation independently for each replica, and exchange values of temperature parameters (or state variables) between replicas with a predetermined exchange probability.

However, in the SA method, since the minimum value may not be obtained unless the value of the temperature parameter is reduced very slowly, the calculation efficiency is poor. Furthermore, the replica exchange method may not efficiently search for the minimum value unless the value of the temperature parameter set to each replica moves all the way from a low temperature region to a high temperature region, but setting of the temperature parameter for that purpose is difficult. On the other hand, when the solution falls into a local minimum, there is a method for facilitating escape from the local minimum by adding an offset to energy included in the equation that determines the transition probability to increase the transition probability in a direction to increase the energy (hereinafter called a dynamic offset method).

Examples of the related art include Japanese Laid-open Patent Publication No. 2018-5541, and Japanese Patent No. 6465231.

Examples of the related art also include Sanroku Tsukamoto, Motomu Takatsu, Satoshi Matsubara and Hirotaka Tamura, "An Accelerator Architecture for Combinatorial Optimization Problems", FUJITSU Sci. Tech. J., Vol. 53, No. 5, September, 2017, pp. 8-13, S. Kirkpatrick, C. D. Gelatt Jr, M. P. Vecchi, "Optimization by Simulated Annealing", Science, Vol. 220, No. 4598, 13 May, 1983, pp. 671-680, Constantino Tsallis, Daniel A. Stariolo, "Generalized simulated annealing", Physica A, 233, 1996, pp. 395-406, and Koji Hukushima and Koji Nemoto, "Exchange Monte Carlo Method and Application to Spin Glass Simulations", J. Phys. Soc. Jpn, Vol. 65, No. 6, June, 1996, pp. 1604-1608.

SUMMARY

According to an aspect of the embodiments, an optimization device includes: a memory configured to store a value of a state variable included in an evaluation function, the evaluation function being obtained by converting a problem; and a processor coupled to the memory, the processor being configured to perform a search for a minimum value of the evaluation function by repeating a process of updating the value of the state variable by a Markov chain Monte Carlo method based on a first transition probability distribution, the first transition probability distribution being a transition probability distribution that is represented by a first function, the first function being a function configured to normalize to one a sum of probabilities of transition from a current state to each of a plurality of different states, the current state being represented by a current value of the state variable, the first transition probability distribution being configured to have a feature that a transition probability becomes larger than in a Boltzmann distribution as a change in the value of the evaluation function due to a change in the value of the state variable is positively larger.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a diagram illustrating an output example of evaluation values;

DESCRIPTION OF EMBODIMENT(S)

However, when the dynamic offset method is used to facilitate escape of the solution from the local minimum and efficiently search for the minimum value of the evaluation function, an offset is added to the energy and the Markov chain is destroyed, and thus accuracy of the solution may be degraded. Furthermore, even when the solution once escapes from the local minimum, it may be captured again by the same local minimum.

According to an aspect of the embodiments, provided are an optimization device, a method for controlling the optimization device, and a program for controlling the optimization device that can efficiently search for a minimum value of an evaluation function without breaking a Markov chain.

In one aspect, it is possible to efficiently search for a minimum value of an evaluation function without breaking the Markov chain.

Hereinafter, embodiments will be described with reference to the drawings.

First Embodiment

Figure 1:
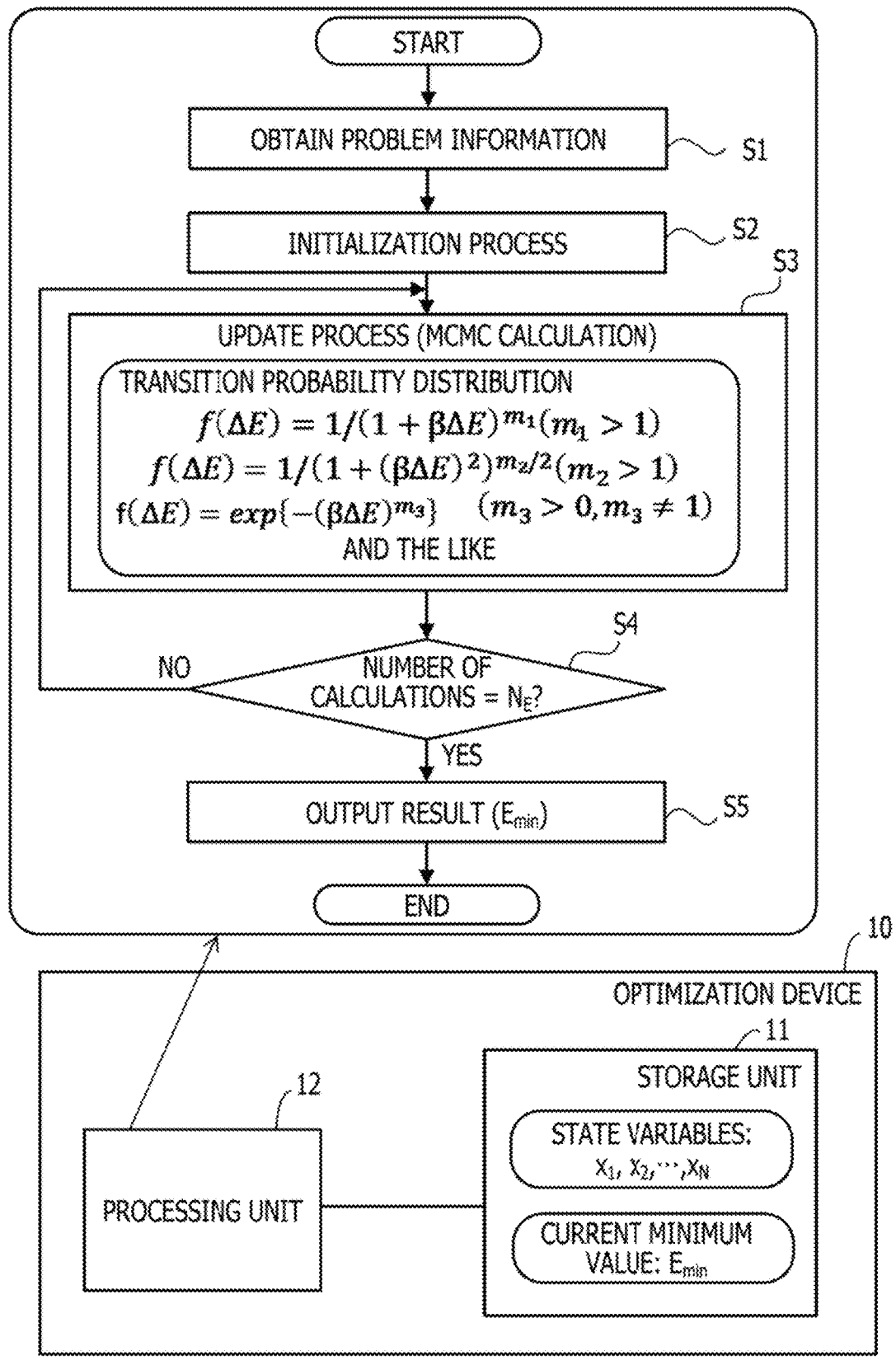
FIG. 1 is a diagram illustrating an example of an optimization device of a first embodiment.

FIG. 1 is a diagram illustrating an example of an optimization device of a first embodiment.

A storage unit 11 stores a value of a state variable included in an evaluation function (hereinafter, referred to as an energy function) obtained by converting a problem, a value of the evaluation function corresponding to the value of the state variable (hereinafter, referred to as energy), and the like. The storage unit 11 is a volatile storage device such as a random access memory (RAM) or a non-volatile storage device such as a hard disk drive (HDD) or a flash memory.

A processing unit 12 searches for a minimum value of the energy function by repeating a process of updating the value of the state variable by an MCMC method. The processing unit 12 is a processor such as a central processing unit (CPU), a general-purpose computing on graphics processing units (GPGPU), or a digital signal processor (DSP). However, the processing unit 12 may include an electronic circuit for a specific application such as an application specific integrated circuit (ASIC), a field programmable gate array (FPGA), and the like. The processor executes a program stored in a memory such as a RAM. For example, a program for controlling the optimization device 10 is executed. Note that a set of a plurality of processors are sometimes referred to as a "multiprocessor" or simply a "processor".

The optimization device 10 searches for, for example, a minimum value (or a combination of values of state variables that can obtain the minimum value) of an Ising-type energy function obtained by converting the problem.

The Ising-type energy function ($H(\{x\})$) is defined, for example, by the following equation (1).

$$H(\{x\}) = -\sum_{i=1}^{N}\sum_{j>i}^{N} W_{ij} x_i x_j - \sum_{i=1}^{N} b_i x_i - C \quad (1)$$

The first term on the right side is an accumulation of a product of values (0 or 1) of two state variables and a weighting factor for all combinations of N state variables without omission and duplication. $x_i$ represents an i-th state variable, $x_j$ represents a j-th state variable, and $W_{ij}$ is a weighting factor indicating the magnitude of an interaction between $x_i$ and $x_j$. The second term on the right side is a total sum of products of bias coefficients ($b_i$) obtained for respective state variables and the values of the respective state variables, and the third term (C) on the right side is a constant.

Furthermore, a change in the value of the energy function (energy difference ($\Delta E_k$)) due to a change in the value of $x_k$, which is one of the state variables, can be expressed as $\Delta E_k = -(1-2x_k)h_k$. $1-2x_k$ represents a variation ($\Delta x_k$) of $x_k$. When $x_k$ changes from 1 to 0, $1-2x_k=-1$, and when $x_k$ changes from 0 to 1, $1-2x_k=1$. Furthermore, $h_k$ is called a local field and can be expressed by the following equation (2). Noted that the equation (2) is represented in an abbreviated form for illustrative purposes. For example, the right side of the equation (2) may be added with other parameters, such as a value regarding a penalty factor of Travelling Salesman Problem (TSP).

$$h_k = \Sigma_{i=1, i \neq k}^{N} W_{ki} x_i \qquad (2)$$

When searching for the minimum value of the energy function as described above, the processing unit 12 repeats the process of updating the value of any one of a plurality of state variables by an MCMC calculation. A stochastic process underlying the MCMC calculation theory is described by the following equation (3).

$$\pi_j(\{x\},t+\Delta t) - \pi_j(\{x\},t) = \Delta t \Sigma_{i \neq j}^{\infty} (\pi_i(\{x\},t) P_{i \to j} - \pi_j(\{x\},t) P_{j \to i}) \qquad (3)$$

In equation (3), $\pi_i(\{x\}, t)$ is a probability that a state defined by $\{x\}$ (indicating the value of each state variable) is realized. $P_{i \to j}$ represents a transition probability of transition from state i to state j. In the MCMC calculation, it is guaranteed that a stationary distribution is achieved by repeating the calculation, and the stationary state is described by the following equation (4).

$$0 = \Delta t \Sigma_{i \neq j}^{\infty} (\pi_i(\{x\},t) P_{i \to j} - \pi_j(\{x\},t) P_{j \to i}) \qquad (4)$$

Here, $\pi_i(\{x\}, t)$ does not depend on time when a Markov chain is in a stationary state. Therefore, equation (4) is a general equation, but in equation (4), a condition in which an equation holds for each term of a sum is often used. This condition is called the principle of detailed balance and is expressed by the following equation (5).

$$0 = \pi_i(\{x\},t) P_{i \to j} - \pi_j(\{x\},t) P_{j \to i} \qquad (5)$$

Next, a Metropolis-Hastings method (hereinafter abbreviated as the M-H method) which is a core part of the MCMC calculation will be described.

In the M-H method, the following equation (6) is used as a transition probability that satisfies the principle of detailed balance (equation (5)).

$$P_{i \to j} = \min\left(1, \frac{\pi_j(\{x\})}{\pi_i(\{x\})}\right) \qquad (6)$$

When an energy difference ($\Delta E = E_j - E_i = H(\{x_j\}) - H(\{x_i\})$) at the time of a state transition from a state i to a state j is smaller than 0, it is a state transition in which energy decreases, and thus equation (6) becomes $P_{i \to j}=1$. On the other hand, since an opposite state transition is a state transition in which energy increases, $P_{j \to i} = \pi_i(\{x\})/\pi_j(\{x\})$. When these are substituted into equation (5), the following equation (7) is satisfied, which satisfies the principle of detailed balance.

$$\pi_i(\{x\})1 - \pi_j(\{x\}) \frac{\pi_i(\{x\})}{\pi_j(\{x\})} = 0 \qquad (7)$$

Conversely, also when $\Delta E = E_j - E_i \geq 0$, the principle of detailed balance is satisfied by a similar logic. Therefore, since the Markov chain converges uniquely, a sampled probability distribution is $\pi_i(\{x\})$.

In the M-H method, when a Boltzmann distribution is used as a probability distribution of $\pi(\{x\}, t)$ as conventionally used, it can be expressed as $\pi(\{x\}, t) = \exp(-\beta E)$ ($\beta$ is an inverse temperature (reciprocal of the value of a temperature parameter)). Then, equation (6) can be expressed as the following equation (8).

$$P_{i \to j} = \min\left(1, \frac{\pi_j(\{x\})}{\pi_i(\{x\})}\right) = \min(1, \exp(-\beta \Delta E)) \qquad (8)$$

However, when the Boltzmann distribution is used as described above, once a solution is captured by a local solution, a probability of escape from the local solution becomes very low. This is because when the transition probability is represented by equation (8), a probability of exponentially exceeding an energy barrier decreases as $\Delta E$ increases positively. For example, even when $-\beta \Delta E$ = approximately 20, since $\exp(-20) \approx 2.06 \times 10^{-9}$, the state transition of $-\beta \Delta E = 20$ occurs only about once in 2.1 billion calculations (the number of MCMC calculations).

For this reason, there is a method for facilitating escape from the local solution using the SA method, the replica exchange method, or the dynamic offset method, but there is a technical problem as described above.

When dealing with a problem on a physical system such as a magnetic material, the Boltzmann distribution has to be used. This is because a thermal equilibrium state follows a statistical distribution of $\exp(-\beta E)$. This is because a simulation of dynamic behaviors of a system that does not satisfy the laws of physics is meaningless. Furthermore, when an entropy effect plays an important role in thermodynamic behaviors of a system, such as Helmholtz free energy or Gibbs free energy, an available transition probability distribution is also restricted in order to properly incorporate the entropy effect.

However, the problem of finding the minimum value of the energy function such as equation (1) represented by the Ising model just needs to be simply regarded as a minimum value solution problem of a function, and thus does not have to be bound to the Boltzmann distribution.

Note that in the energy function such as equation (1), there are $2^N$ solutions. A set $\{E\}$ of them arranged in ascending order of energy is $\{E\} = \{E_0, E_1, E_2, \ldots, E_i \ldots, E_j, \ldots, E_M\}$. For example, if $i<j$, $E_i<E_j$. Here, M is $M \leq 2^N$. This is because solutions are allowed to overlap. Then, $E_0$ is bounded below. For example, it does not diverge to negative infinity, and there is a minimum value.

Hereinafter, before presenting a distribution that replaces the Boltzmann distribution, first, the transition probability is defined as in the following equation (9).

$$P_{i \to j} = \min(1, f(\Delta E)) \qquad (9)$$

In equation (9), $f(\Delta E)$ is a function that is 1 when $\Delta E<0$, or that an equation of $f(\Delta E)$ is applied when $\Delta E \geq 0$. Furthermore, a normalized integral of f(ΔE) exists. The existence of a normalized integral means that the normalized integral is not zero and does not diverge to positive infinity or negative infinity, but becomes a finite value (positive real number). For example, f(ΔE) such that the value of the normalized integral becomes 1 as in the following equation (10) can be selected.

$$\int_0^\infty f(\Delta E) d\{\Delta E\} = 1 \qquad (10)$$

For example, f(ΔE) is represented by a function that can be normalized so that the sum of probabilities (transition probabilities) of a transition from the current state represented by the value of the current state variable to each of a plurality of different states (transition probability) becomes 1. However, f(ΔE) is selected so that f(0)=1.

A stochastic matrix is defined as in the following equation (11).

$$P = \begin{pmatrix} p_{11} & p_{12} & \cdots & p_{1M} \\ p_{21} & p_{22} & \cdots & p_{2M} \\ \cdots & \cdots & \cdots & \cdots \\ p_{M-11} & p_{M-12} & \cdots & p_{M-1M} \\ p_{M1} & p_{M2} & \cdots & p_{MM} \end{pmatrix} \qquad (11)$$

Furthermore, each element of the stochastic matrix (P) is defined as in the following equation (12).

$$p_{ij} = \frac{f(\Delta E_{ij})}{Z} \qquad (12)$$

$$Z = \sum_{j=1}^{M} f(\Delta E_{ij})$$

In equation (12), $\Delta E_{ij} = E_j - E_i$. Therefore, the following equation (13) holds for each row of the stochastic matrix.

$$\sum_{j=1}^{M} p_{ij} = 1 \qquad (13)$$

Therefore, this stochastic matrix has an eigenvalue of 1 and forms a stationary Markov chain.

Note that equations (9) to (13) described above are formulated for the case where the state variable is a value of 0 or 1 (when the energy is discrete) as in the Ising-type evaluation function, but may also be applied to a case where the state variable is a continuous variable (when the energy is a continuous function). The reason will be briefly described below. When a continuous variable is used, a transition probability in $E_i$ is used assuming that a transition probability in a small section $[E_i, E_i+\Delta E]$ does not change for an energy section $[E_0, E_1]$. Then, if a transition probability from a state of $[E_i, E_i+\Delta E]$ to $[E_j, E_j+\Delta E]$ is $f(\Delta E) = f(E_j - E_j)$, it becomes exactly the same calculation as that when the Ising-type evaluation function that is a discrete model is used. Note that since a basic part of the proof is the same, the proof for a case where the state variable is a continuous variable is omitted.

Note that the method described above generally breaks the principle of detailed balance represented in equation (5). When the Boltzmann distribution, which is a special case of this method, is used (when $f(\Delta E) = \exp(-\beta \Delta E)$), the principle of detailed balance is satisfied.

Next, an example of a transition probability distribution (f(ΔE)) that replaces the Boltzmann distribution will be described. A condition needed for f(ΔE) is a condition that it can be normalized as expressed in equation (10), and any transition probability distribution may be applied if this condition is satisfied. However, the processing unit 12 of the optimization device 10 uses transition probability distributions represented by, for example, the following equations (14), (15), and (16) from the viewpoint of solving the minimum value solution problem (optimization problem) efficiently.

$$f(\Delta E) = \frac{1}{(1 + \beta \Delta E)^{m_1}} \qquad (14)$$

$$f(\Delta E) = \frac{1}{(1 + (\beta \Delta E)^2)^{m_2/2}} \qquad (15)$$

$$f(\Delta E) = \exp\{-(\beta \Delta E)^{m_3}\} \qquad (16)$$

However, $m_1 > 1$, $m_2 > 1$, and $m_3 > 0$ in equations (14) to (16) in order to satisfy the normalization condition of equation (10).

Note that Non Patent Literature 3 describes a transition probability distribution that can be expressed as $P_q(x_t \to x_{t+1}) = 1/[1+(q-1)\beta \Delta E]^{1/q-1}$ (refer to equation (5) in Non Patent Literature 3). This equation is different from equation (14). This is because when q=2, the result is the same as when $m_1 = 1$ in equation (14), but in equation (14), $m_1 > 1$ as described above. Note that in Non Patent Literature 3, when $q \geq 2$ in $1/[1+(q-1)\beta \Delta E]^{1/q-1}$, the normalized integral diverges to infinity (there is no normalized integral), and thus the transition probability becomes stochastically incorrect. Furthermore, in Non Patent Literature 3 when q=1, the transition probability distribution becomes the Boltzmann distribution. When q<1, the transition probability is represented by a power. For example, when q=½, it becomes $P_q(x_t - x_{t+1}) = (1 - \beta \Delta E/2)^2$, but when $1 - \beta \Delta E/2 < 0$ is satisfied, which is when ΔE becomes positively large, the transition probability diverges to infinity. For this reason, in Non Patent Literature 3 under such conditions, the transition probability is set to 0, but in this case, when the solution is captured by a local minimum with a deep value (large ΔE), it becomes impossible to escape. Equation (14) has been formulated so that these situations do not occur.

Note that the transition probability distribution represented by equation (15) is called Cauchy distribution when $m_2 = 2$. The transition probability distribution represented by equation (16) is a Boltzmann distribution when $m_3 = 1$, and is a normal distribution when $m_3 = 2$.

Therefore, among equations (14) to (16), a distribution in a case other than $m_3 = 1$ in equation (16) is the transition probability distribution that replaces the Boltzmann distribution.

Note that the transition probability distribution to be used just needs to be a distribution in which the greater the energy difference, the greater the transition probability than in the Boltzmann distribution, but it is desirable to selectively use a transition probability distribution depending on the application. For example, in terms of the amount of calculation, in equations (14) and (15), the transition probability distribution approximately becomes a function to be defined by m, such as $f(\Delta E) \approx (\beta \Delta E)^{-m}$ in the region of $\Delta E \gg 1$. When $m = 1 + \delta$, by taking δ sufficiently small, the transition probability distribution asymptotically becomes like the following equation (17).

$$f(\Delta E) \cong \lim_{\delta \to 0} (\beta \Delta E)^{-(1+\delta)} = (\beta \Delta E)^{-1} \qquad (17)$$

From the viewpoint of the amount of calculation, when the Boltzmann distribution is used as the transition probability distribution, $N_B = \exp(\beta\Delta E)$, where $N_B$ is an average number of calculations exceeding $\Delta E$. On the other hand, when equations (14) and (15) are used, a relationship represented by $N_f \approx (\beta\Delta E)^m$ holds, where $N_f$ is the average calculation number exceeding $\Delta E$, and then letting the solution escape from the local minimum of the energy function may be considered to be merely a polynomial time (P) problem of the calculation amount defined by a power. Noted that $N_f$ may be referred to as an average number of calculations exceeding $\Delta E$.

As described above, the processing unit 12 may solve the problem that the transition probability decreases exponentially when $\Delta E$ is large by using the transition probability distribution in which the transition probability is larger than in the Boltzmann distribution as $\Delta E$ is larger.

Next, it is considered how to improve efficiency of energy search capability when solving the minimum value solution problem.

In the M-H method, a state transition satisfying $\Delta E<0$ is accepted, and a state transition in which energy is increased is also accepted stochastically. Due to the nature of the M-H method, when the state transition in the region of $\Delta E \approx 0$ is accepted too much, directions in which the energy increases and directions in which the energy decreases are equalized. As a result, the energy search capability is reduced.

When the Boltzmann distribution is used as the transition probability distribution, since a derivative of the transition probability changes discontinuously at the boundary of $\Delta E=0$, a state transition with a small increase in energy is efficiently rejected. This is an advantage when using the Boltzmann distribution as the transition probability distribution.

The processing unit 12 uses this advantage of the Boltzmann distribution, and makes the transition probability proportional to the power of DE in the region of $\Delta E \gg 1$. Accordingly, when using equation (14), the processing unit 12 just needs to set $m_1=1+\delta$, and set $\delta>0$ and $\delta \ll 1$. For example, $m_1=1.0001$ just needs to be set.

Figure 2:
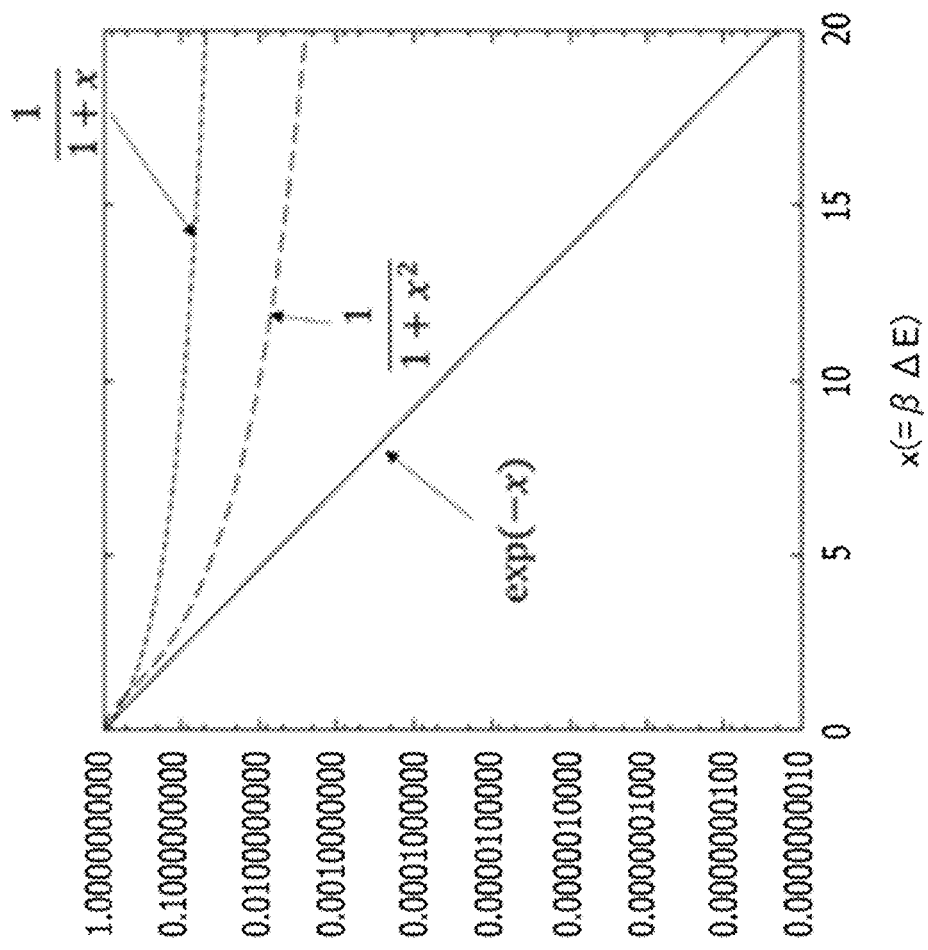
FIG. 2 is a diagram illustrating an example of comparing a Boltzmann distribution with two distributions different from the Boltzmann distribution.
Figure 2:
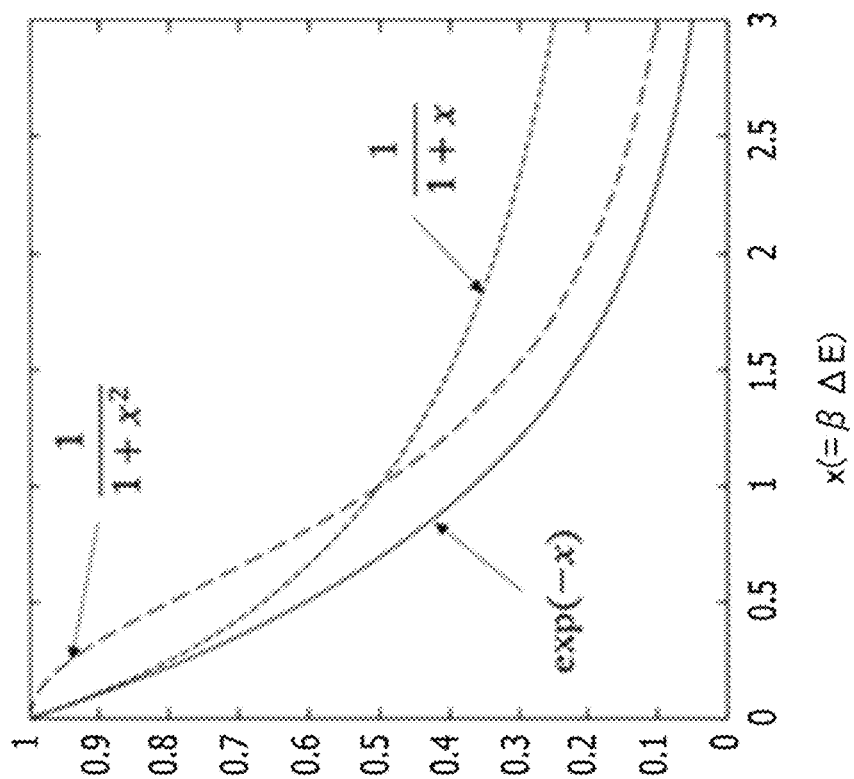

FIG. 2 is a diagram illustrating an example of comparing a Boltzmann distribution with two distributions different from the Boltzmann distribution. In FIG. 2, the horizontal axis represents $x$ ($=\beta\Delta E$), and the vertical axis represents $f(x)$ (transition probability). Ranges of $x$ and $f(x)$ are different between a left graph and a right graph in FIG. 2.

In FIG. 2, a distribution (Boltzmann distribution) represented by $f(x)=\exp(-x)$ and two distributions represented by $f(x)=1/(1+x^2)$ and $f(x)=1/(1+x)$ are illustrated. In the transition probability distribution represented in equation (14), by making $m_1$ close to 1 as described above, it becomes almost the same distribution as $f(x)=1/(1+x)$. $f(x)=1/(1+x^2)$ is equal to a transition probability distribution where $m_2=2$ in equation (15).

As can be seen from the graph on the left side of FIG. 2, $f(x)=1/(1+x)$ asymptotically approaches the Boltzmann distribution in a region where $\Delta E \approx 0$. Furthermore, as can be seen from the graph on the right side in FIG. 2, $1/(1+x)$ and $1/(1+x^2)$ are values (transition probabilities) larger than $\exp(-x)$ in the region of $x$ ($=\beta\Delta E) \gg 1$. When $\beta\Delta E=20$, $f(x)$ is approximately $\exp(-20.0) \approx 2.1 \times 10^{-9}$ in the Boltzmann distribution. Therefore, the state transition in which $\beta\Delta E=20$ is accepted only about once every 2.1 billion times. On the other hand, in the transition probability distribution represented by equation (14), when $m_1$ is made close to 1 and approximated to $1/(1+x)$, the transition probability is about 0.05 when $\Delta E=20$, and thus the state transition in which $\beta\Delta E=20$ is accepted once every 20 times. Therefore, the state transition can be generated 24 million times more efficiently than when the Boltzmann distribution is used.

FIG. 1 illustrates an example of a method for controlling the optimization device 10.

The processing unit 12 obtains problem information (step S1). The problem information includes, for example, a weighting factor ($W_{ij}$), a bias coefficient ($b_i$), a constant (C), and the like of the energy function represented in equation (1). The problem information may include information of a transition probability distribution to be used (including values of $m_1$ to $m_3$ in equations (14) to (16) described above), temperature information (for example, an inverse temperature ($\beta$)), a value of the state variable included in the energy function, the number of calculations as an end condition for the MCMC calculation, and the like. The problem information may be supplied from the outside or may be stored in the storage unit 11 in advance.

Next, the processing unit 12 performs an initialization process (step S2). The initialization process includes a process of initializing the state variables $x_1$ to $x_N$ stored in the storage unit 11 when the energy function is represented by equation (1). For example, $x_1$ to $x_N$ may be all initialized to 0, or may be all initialized to 1. Further, $x_1$ to $x_N$ may be initialized such that 0 and 1 are set at random, or may be initialized by a value supplied from the outside. Furthermore, the initialization process includes a process of calculating an initial value of energy by equation (1) based on the problem information and initial values of the state variables. The initial value of energy is stored in the storage unit 11 as a current minimum value ($E_{min}$).

Thereafter, the processing unit 12 performs an update process (step S3). In the update process, the processing unit 12 updates the values of the state variables by the MCMC calculation based on a transition probability distribution that satisfies the above-described normalization condition and has a larger transition probability than the Boltzmann distribution as $\Delta E$ is larger, and is represented, for example, by any of the above-described equations (14) to (16).

For example, the processing unit 12 selects one of $x_1$ to $x_N$ at random and calculates $\Delta E$ when the value of the selected state variable is inverted (changed from 0 to 1 or 1 to 0). Then, if $\Delta E$ is negative, the processing unit 12 inverts the value of the selected state variable (determines the update). If $\Delta E$ is positive, for example, if $f(\Delta E)<R$ is true based on a comparison result of $f(\Delta E)$ in any of equations (14) to (16) with a uniform random number R of $0 \leq R \leq 1$, the processing unit 12 inverts the value of the selected state variable. If $f(\Delta E)<R$ is not true, the processing unit 12 does not invert the value of the selected state variable. Noted that, in view of the application to developing of a concrete system, the above relationship between $f(\Delta E)$ and the random number R may be reversed. For example, the relationship may be adjusted such that if $f(\Delta E)>R$ is true then the processing unit 12 inverts the value of the selected state variable.

Furthermore, in the process of step S3, when the value of the state variable is inverted, the processing unit 12 updates the energy. When the updated energy is the minimum value so far, the processing unit 12 updates $E_{min}$ stored in the storage unit 11. Note that the storage unit 11 may store the value of each state variable when $E_{min}$ is obtained as a candidate for an optimal solution.

After the processing in step S3, the processing unit 12 determines whether or not the number of MCMC calculations has reached a predetermined number ($N_E$) that is an end condition (step S4). When the number of calculations has not reached $N_E$, the process from step S3 is repeated.

When the number of calculations has reached $N_E$, the processing unit 12 outputs the current $E_{min}$ stored in the storage unit 11 as a current calculation result to, for example, an external device (an external computer, a storage medium, a display device, or the like) (step S5), and ends the process.

With the optimization device 10 of the first embodiment as described above, the transition probability distribution in which the transition probability is larger than in the Boltzmann distribution as ΔE is positively larger is applied, and thus a solution can escape from a local solution with high efficiency. Furthermore, since it is not a method of adding an offset to energy as in the dynamic offset method, the Markov chain may not be broken.

From the above, it is possible to efficiently search for a minimum value of an energy function without breaking the Markov chain.

Second Embodiment

Figure 3:
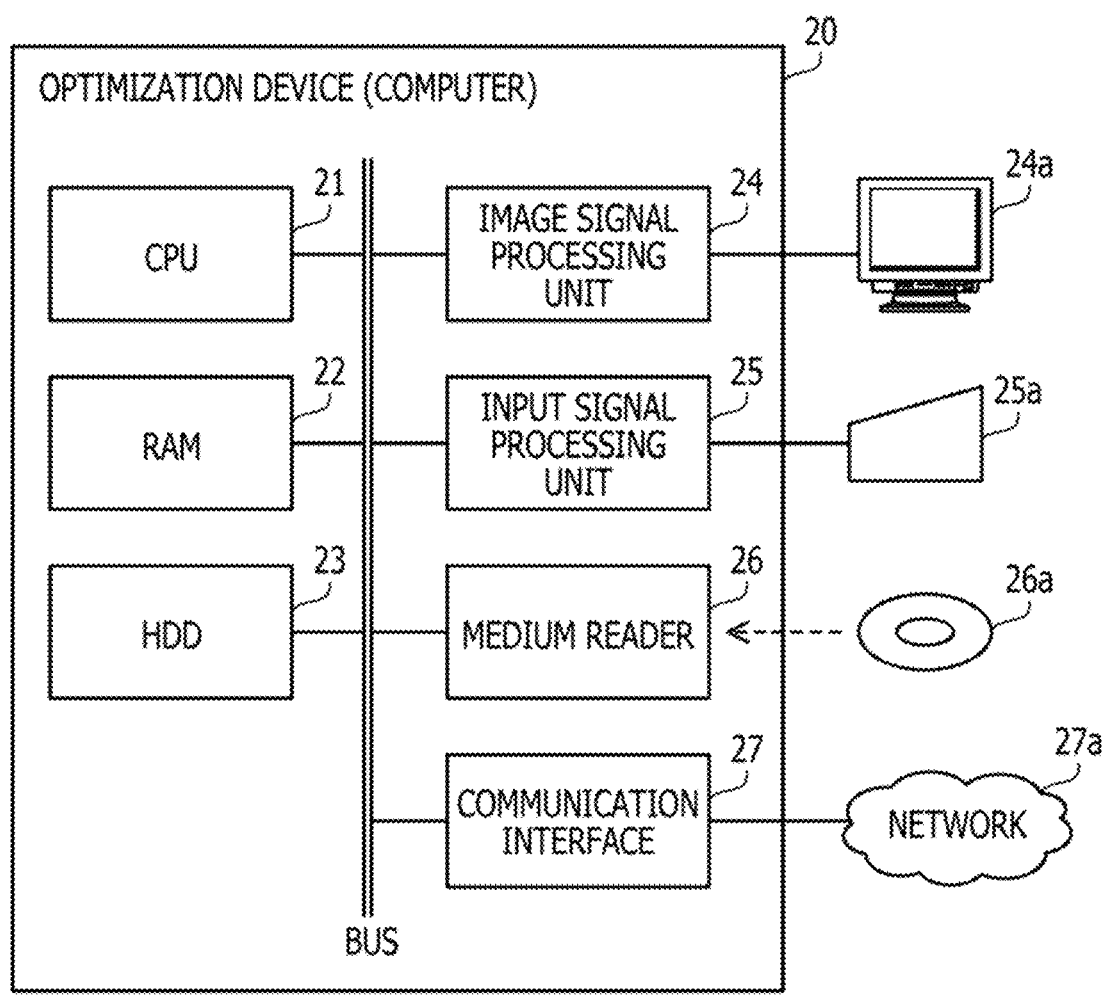
FIG. 3 is a diagram illustrating an example of hardware of an optimization device of a second embodiment.

FIG. 3 is a diagram illustrating an example of hardware of an optimization device of a second embodiment.

The optimization device 20 of the second embodiment is, for example, a computer, and includes a CPU 21, a RAM 22, an HDD 23, an image signal processing unit 24, an input signal processing unit 25, a medium reader 26, and a communication interface 27. The above units are connected to a bus.

The CPU 21 is a processor including an arithmetic circuit that executes program instructions. The CPU 21 loads at least part of programs and data stored in the HDD 23 into the RAM 22 to execute programs. Note that the CPU 21 may include a plurality of processor cores, the optimization device 20 may include a plurality of processors, and processes to be described below may be performed in parallel using the plurality of processors or processor cores. Furthermore, a set of a plurality of processors (multiprocessors) may be called a "processor".

The RAM 22 is a volatile semiconductor memory that temporarily stores programs executed by the CPU 21 and data used by the CPU 21 for arithmetic operations. Note that the optimization device 20 may include any type of memory other than RAM, or may include a plurality of memories.

The HDD 23 is a non-volatile storage device that stores programs of software such as an operating system (OS), middleware, and application software, and data. The programs include, for example, a program for controlling the optimization device 20. Note that the optimization device 20 may include another type of storage device such as a flash memory or a solid state drive (SSD), and may include a plurality of nonvolatile storage devices.

The image signal processing unit 24 outputs an image to a display 24a connected to the optimization device 20 according to a command from the CPU 21. As the display 24a, a cathode-ray tube (CRT) display, a liquid crystal display (LCD), a plasma display panel (PDP), an organic electro-luminescence (OEL), or the like display may be used.

The input signal processing unit 25 obtains an input signal from an input device 25a connected to the optimization device 20, and outputs the signal to the CPU 21. As the input device 25a, a pointing device such as a mouse, a touch panel, a touch pad, and a trackball, a keyboard, a remote controller, and a button switch and the like may be used. Furthermore, a plurality of types of input devices may be connected to the optimization device 20.

The medium reader 26 is a reading device that reads a program or data recorded on a recording medium 26a. As the recording medium 26a, for example, a magnetic disk, an optical disk, a magneto-optical disk (MO), a semiconductor memory, or the like may be used. Examples of the magnetic disk include a flexible disk (FD) and an HDD. Examples of the optical disk include a compact disc (CD) and a digital versatile disc (DVD).

The medium reader 26 copies, for example, a program or data read from the recording medium 26a to another recording medium such as the RAM 22 or the HDD 23. The read program is executed by the CPU 21, for example. Note that the recording medium 26a may be a portable recording medium, and may be used for distribution of a program or data. Furthermore, the recording medium 26a and the HDD 23 may be also referred to as a computer-readable recording media.

The communication interface 27 is an interface that is connected to the network 27a and communicates with another information processing device via the network 27a. The communication interface 27 may be a wired communication interface connected by a cable to a communication device such as a switch, or may be a wireless communication interface connected to a base station via a wireless link.

Next, functions and processing procedures of the optimization device 20 will be described.

Figure 4:
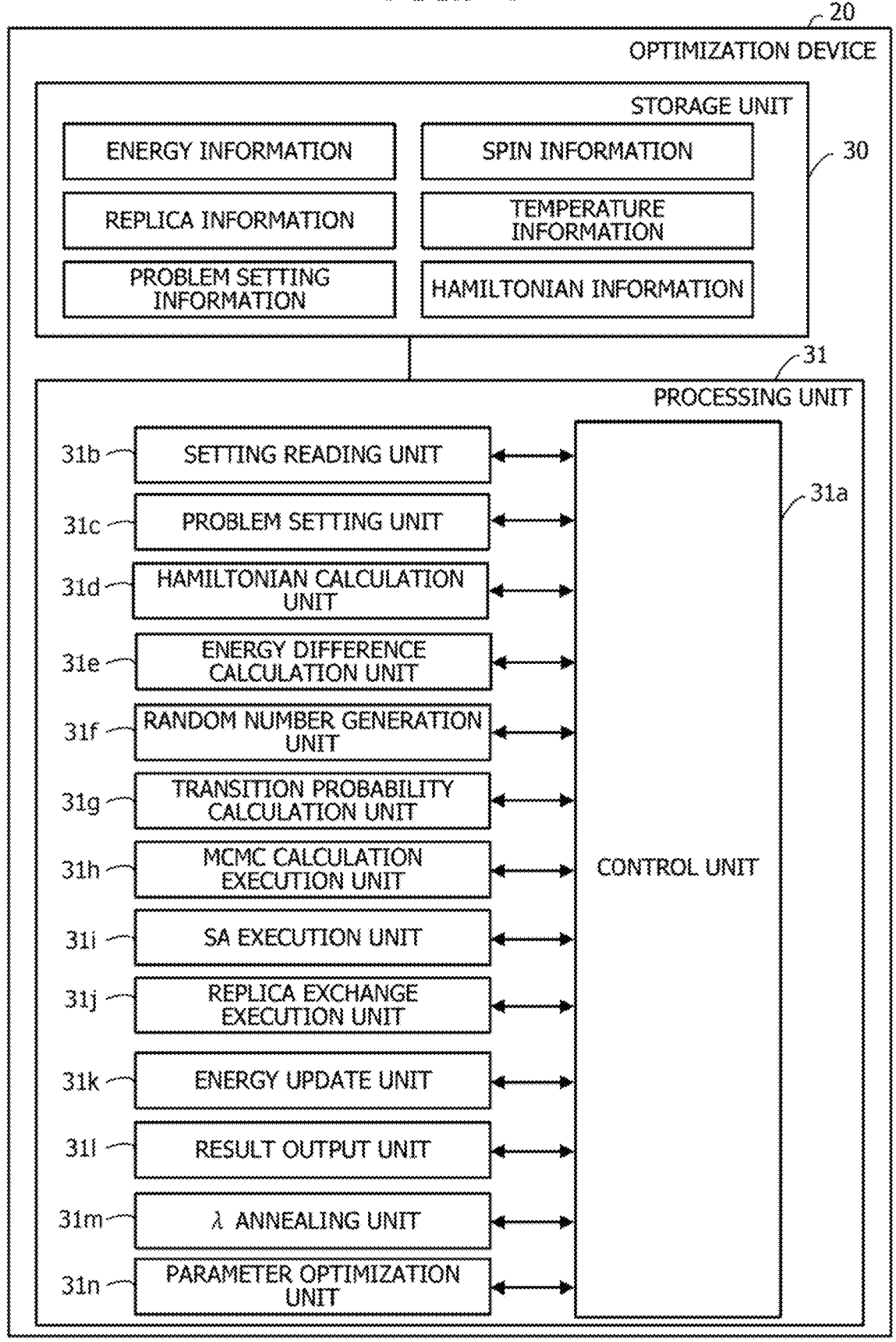
FIG. 4 is a block diagram illustrating a function example of an optimization device of a second embodiment.

FIG. 4 is a block diagram illustrating a function example of the optimization device of the second embodiment.

The optimization device 20 has a storage unit 30 and a processing unit 31. The processing unit 31 has a control unit 31a, a setting reading unit 31b, a problem setting unit 31c, a Hamiltonian calculation unit 31d, an energy difference calculation unit 31e, a random number generation unit 31f, a transition probability calculation unit 31g, an MCMC calculation execution unit 31h, an SA execution unit 31i, and a replica exchange execution unit 31j. Moreover, the processing unit 31 has an energy update unit 31k, a result output unit 31l, a λ annealing unit 31m, and a parameter optimization unit 31n.

Note that the storage unit 30 may be implemented using, for example, a storage area secured in the HDD 23. The processing unit 31 may be implemented using, for example, a program module executed by the CPU 21.

The storage unit 30 stores energy information, spin information, replica information, temperature information, problem setting information, and Hamiltonian information.

The energy information includes an initial value of calculated energy and $N_{rank}$ pieces of energy calculated so far from the minimum value in ascending order. Furthermore, the energy information may include $N_{rank}$ combinations of values of respective state variables corresponding to the $N_{rank}$ pieces of energy. The spin information includes values of the respective state variables. The replica information is information used for executing the replica exchange method, and includes the number of replicas and the like. The temperature information includes a value of a temperature parameter (hereinafter, simply referred to as a temperature) or an inverse temperature. The problem setting information Includes, for example, the optimization method to be used (the SA method, the replica exchange method, or the like), frequencies of replica exchange and annealing, sampling frequency, temperature change schedule, information of transition probability distribution to be used, and the number of MCMC calculations that is a calculation end condition. The Hamiltonian information includes, for example, a weighting factor ($W_{ij}$), a bias coefficient ($b_i$), and a constant (C) of the energy function represented in equation (1).

The control unit 31a controls each unit of the processing unit 31 to perform a minimum value solution process.

The setting reading unit 31b reads the above-described various types of information from the storage unit 30 in a format that can be understood by the control unit 31a.

The problem setting unit 31c calculates an initial value of a state variable and an initial value of a minimum value of energy.

The Hamiltonian calculation unit 31d calculates energy.

The energy difference calculation unit 31e calculates an energy difference due to inversion of a value of a state variable.

The random number generation unit 31f generates a random number for randomly selecting a state variable to be inverted. As the random number generation unit 31f, any type may be used, but it is desirable to use a pseudo random number generator such as a Mersenne Twister having a period sufficiently larger than the number of MCMC calculations.

The transition probability calculation unit 31g calculates a value of a transition probability distribution based on a selected equation of the transition probability distribution, a temperature or an inverse temperature, and a calculated energy difference.

The MCMC calculation execution unit 31h performs the MCMC calculation of determining whether or not to update the value of the selected state variable according to a calculated value of the transition probability distribution.

The SA execution unit 31i lowers the temperature based on the temperature change schedule, in order to execute the SA method.

The replica exchange execution unit 31j exchanges temperatures between replicas based on an exchange probability as described later, in order to execute the replica exchange method.

The energy update unit 31k updates the energy information stored in the storage unit 30 based on the energy calculated by the Hamiltonian calculation unit 31d.

The result output unit 31l outputs the energy information as a calculation result when the current number of MCMC calculations reaches a predetermined number (hereinafter, referred to as $N_E$) that is the calculation end condition. Note that the result output unit 31l may output energy calculated at this moment and the value of each state variable corresponding to the energy every number of calculations that is smaller than $N_E$ (hereinafter referred to as $N_I$). In that case, the optimization device 20 functions as a sampling device, and $N_I$ is the sampling frequency.

The λ annealing unit 31m executes a λ annealing method (also referred to as a parameter annealing method or a two-state transition method) as described later, which is an annealing method different from the SA method.

The parameter optimization unit 31n performs a process of optimizing various parameters by a method as described later.

Figure 5:
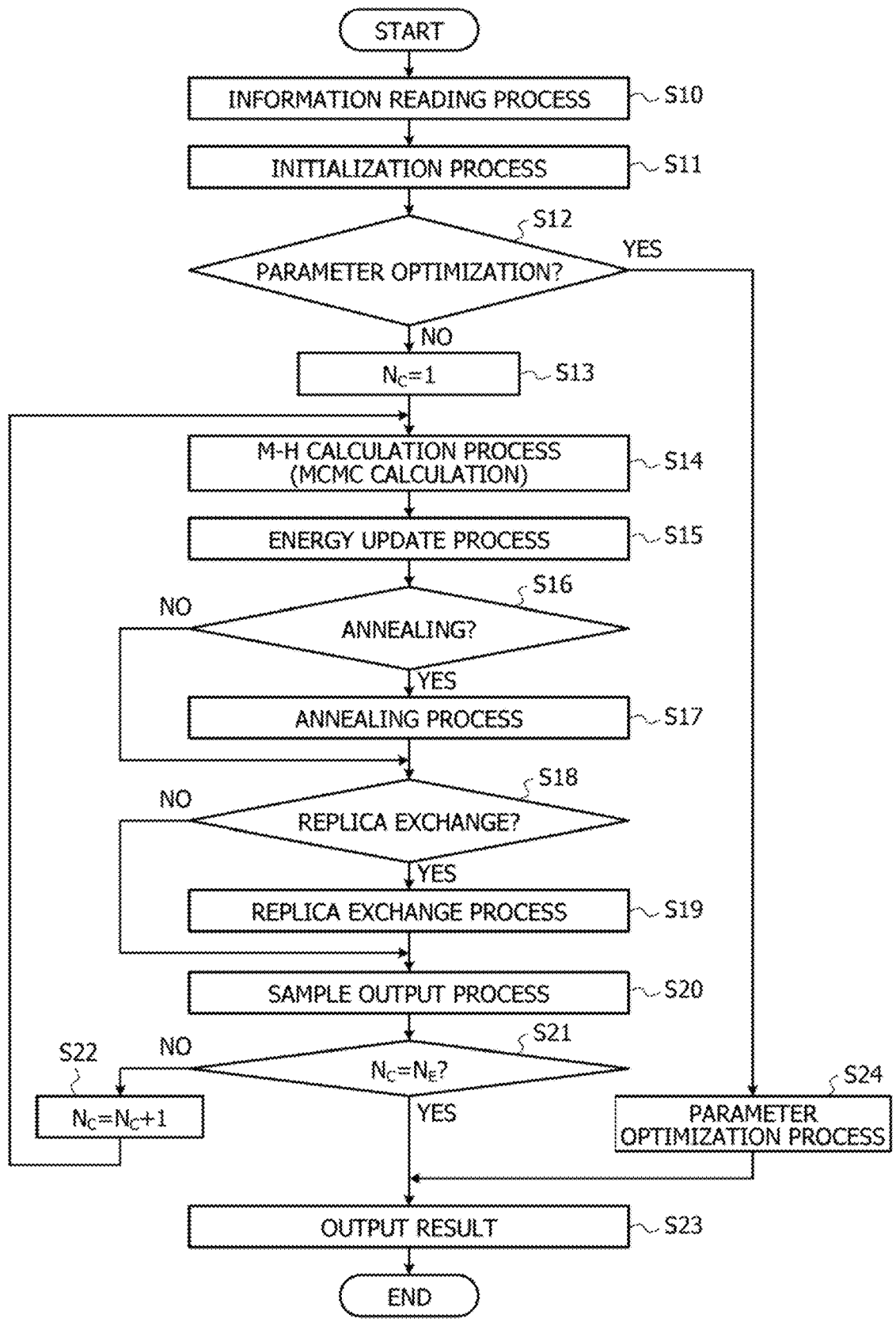
FIG. 5 is a flowchart illustrating a process flow of an example of a method for controlling the optimization device of the second embodiment.

FIG. 5 is a flowchart illustrating a process flow of an example of a method for controlling the optimization device of the second embodiment.

When the process starts, first, the setting reading unit 31b reads the above-described various types of information from the storage unit 30 in a format that can be understood by the control unit 31a (step S10). Examples of the information to be read will be described later. Thereafter, the problem setting unit 31c performs an initialization process including initialization of the state variables and calculation of an initial value of energy (step S11). Then, for example, the control unit 31a determines whether or not problem setting information read from the storage unit 30 includes information instructing to perform a parameter optimization process (step S12). When the control unit 31a determines that the information instructing to perform the parameter optimization process is included, a process of step S24 is performed.

When the control unit 31a determines that it is not specified to perform the parameter optimization process, the control unit 31a initializes $N_C$ that indicates the current number of MCMC calculations (hereinafter, also referred to as the number of steps) to 1 (step S13). After the process of step S13, the MCMC calculation execution unit 31h performs an M-H calculation process by the MCMC calculation (step S14). An example of the M-H calculation process will be described later. Thereafter, the energy update unit 31k performs an energy update process of updating the energy information stored in the storage unit 30 based on energy calculated by the Hamiltonian calculation unit 31d according to a result of the M-H calculation process (step S15).

After the process of step S15, the control unit 31a determines whether or not the problem setting information read from the storage unit 30 includes information instructing to perform annealing (SA method or λ annealing method) (step S16). When the control unit 31a determines that the information instructing to perform annealing is included, an annealing process by the SA execution unit 31i or the λ annealing unit 31m is performed (step S17). An example of the annealing process will be described later. After the annealing process, or when the control unit 31a determines that the problem setting information does not include the information instructing to perform the annealing, a process of step S18 is performed.

In the process of step S18, the control unit 31a determines whether or not the problem setting information read from the storage unit 30 includes information instructing to perform the replica exchange method (step S18). When the control unit 31a determines that the information instructing to perform the replica exchange method is included, the replica exchange execution unit 31j performs a replica exchange process (step S19). An example of the replica exchange process will be described later. After the replica exchange process, or when the control unit 31a determines that the problem setting information does not include the information instructing to perform the replica exchange method, a process of step S20 is performed. Note that since the annealing process by the SA method and the replica exchange process are mutually exclusive processes, either one may be selected. On the other hand, the annealing process, by the λ annealing method and the replica exchange process may be simultaneously selected.

In the process of step S20 (sample output process), every time $N_I$ times of calculation processes are performed, the result output unit 31l outputs energy calculated at that time and the value of each state variable corresponding to the energy. An example of the sample output process will be described later.

Next, the control unit 31a determines whether or not $N_C=N_E$ is true (step S21). When it is determined that $N_C=N_E$ is not true, the control unit 31a adds +1 to $N_C$ (step S22). Thereafter, the process from step S14 is repeated. When the control unit 31a determines that $N_C=N_E$ is true, the result output unit 31l outputs energy information as a calculation result (step S23). Thereafter, the processing of the optimization device 20 ends. The output energy information includes, for example, $N_{rank}$ pieces of energy in which the pieces of energy calculated so far are arranged in ascending order from the minimum value. Furthermore, the energy information includes $N_{rank}$ combinations of the values of the respective state variables corresponding to the $N_{rank}$ pieces of energy.

In the process of step S24, the parameter optimization unit 31n performs a process of optimizing various parameters by a method as described later, and displays a result thereof. Thereafter, the processing of the optimization device 20 ends.

Note that the process flow illustrated in FIG. 5 is an example, and the order of the processes may be appropriately changed.

Example of Information Reading Process

Figure 6:
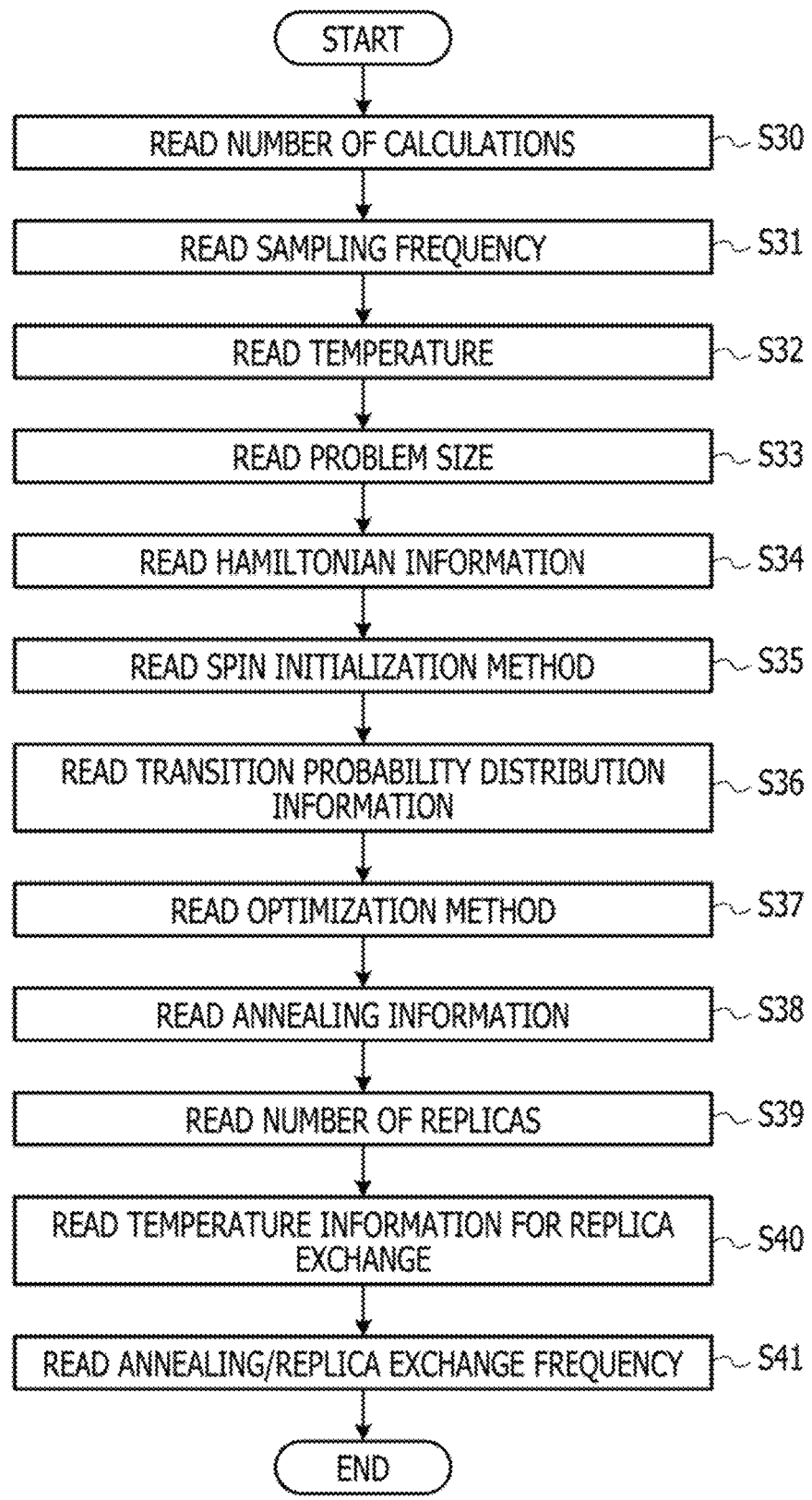
FIG. 6 is a flowchart illustrating a process flow of an example of an information reading process.

FIG. 6 is a flowchart illustrating a process flow of an example of an information reading process.

The setting reading unit 31b reads the number of calculations ($N_E$) that is the calculation end condition and the sampling frequency ($N_J$) from the storage unit 30 (steps S30 and S31). Moreover, the setting reading unit 31b reads the temperature (for example, T (temperature (absolute temperature)) that determines $\beta(=1/T)$ in the above-described equations (14) to (16)) from the storage unit 30 (step S32). Furthermore, the setting reading unit 31b reads the problem size (the number of state variables (N)) and the Hamiltonian information (the weighting factor ($W_{ij}$), the bias coefficient ($b_i$), and the constant (C) of the energy function represented in equation (1)) from the storage unit 30 (steps S33 and S34).

Furthermore, the setting reading unit 31b reads a spin initialization method (how to determine initial values of state variables) and transition probability distribution information from the storage unit 30 (steps S35 and S36). The transition probability distribution information includes information indicating which transition probability distribution is used for the MCMC calculation (distribution name and the like) and parameters of the transition probability distribution to be used (for example, $m_1$ to $m_3$ in equations (14) to (16)).

Moreover, the setting reading unit 31b reads the optimization method (SA method, replica exchange method, or the like) and annealing information (for example, temperature change schedule and annealing frequency) to be used from the storage unit 30 (steps S37 and S38). Furthermore, the setting reading unit 31b reads, from the storage unit 30, the number of replicas, temperature information for replica exchange (a temperature sequence to be set to each replica), and frequencies of annealing and replica exchange (steps S39, S40, and S41), and ends the information reading process.

Note that the process flow illustrated in FIG. 6 is an example, and the order of the processes may be appropriately changed.

Example of Initialization Process

In the Ising model, initialization of spins (state variables) is important. In an example of the initialization process described below, the problem setting unit 31c performs one of four types of spin initialization methods ("External", "Random", "One", and "Zero").

Figure 7:
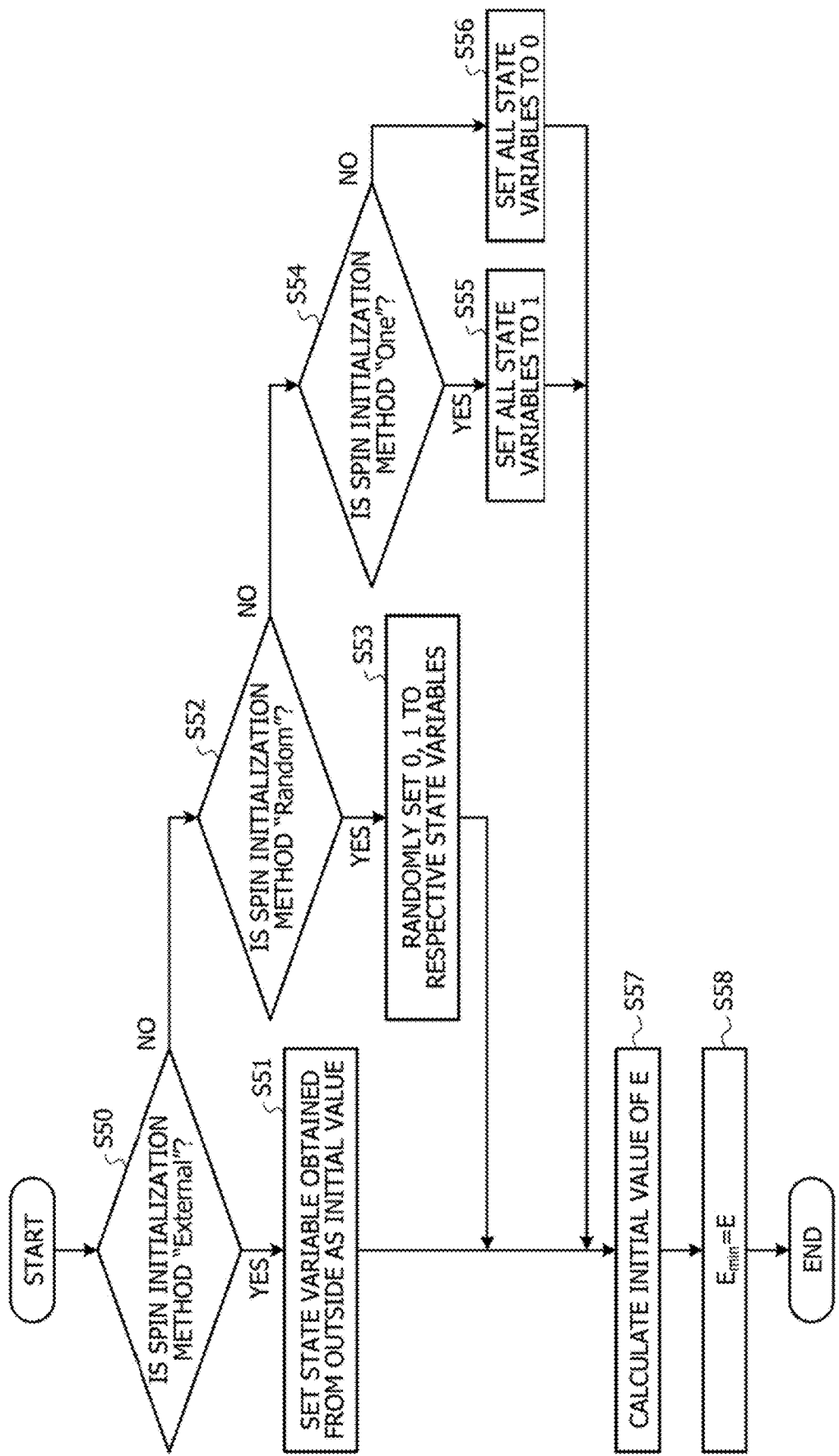
FIG. 7 is a flowchart illustrating a process flow of an example of an initialization process.

FIG. 7 is a flowchart illustrating a process flow of an example of the initialization process.

For example, first, the problem setting unit 31c determines whether or not the spin initialization method is "External" (step S50). When it is determined that the spin initialization method is "External", the problem setting unit 31c sets a state variable obtained from outside of the optimization device 20 as an initial value of the spin information (step S51).

When it is determined that the spin initialization method is not "External", the problem setting unit 31c determines whether or not the spin initialization method is "Random" (step S52). When it is determined that the spin initialization method is "Random", the problem setting unit 31c randomly sets 0 or 1 to each of state variables to use it as an initial value of the spin information (step S53). For example, the problem setting unit 31c sets all the state variables to 0 with a probability of 50%, and sets 1 to state variables that have not been set to 0.

When it is determined that the spin initialization method is not "Random", the problem setting unit 31c determines whether or not the spin initialization method is "One" (step S54). When it is determined that the spin initialization method is "One", the problem setting unit 31c sets all the state variables to 1 and use them as initial values of the spin information (step S55).

When it is determined that the spin initialization method is not "One", the problem setting unit 31c determines that the spin initialization method is "Zero", and sets all the state variables to 0 to take them as initial values of the spin information to (step S56).

After the processes of steps S51, S53, S55, and S56, the problem setting unit 31c calculates an initial value of energy (E) (step S57). The problem setting unit 31c calculates an initial value of energy based on the Hamiltonian information and the initial values of the spin information by using equation (1).

Moreover, by setting $E_{min}=E$, the problem setting unit 31c sets the calculated initial value of energy as the minimum value of the energy ($E_{min}$) (step S58), and ends the initialization process.

Note that the process flow illustrated in FIG. 7 is an example, and the order of the processes may be appropriately changed.

Example of M-H Calculation Process

Figure 8:
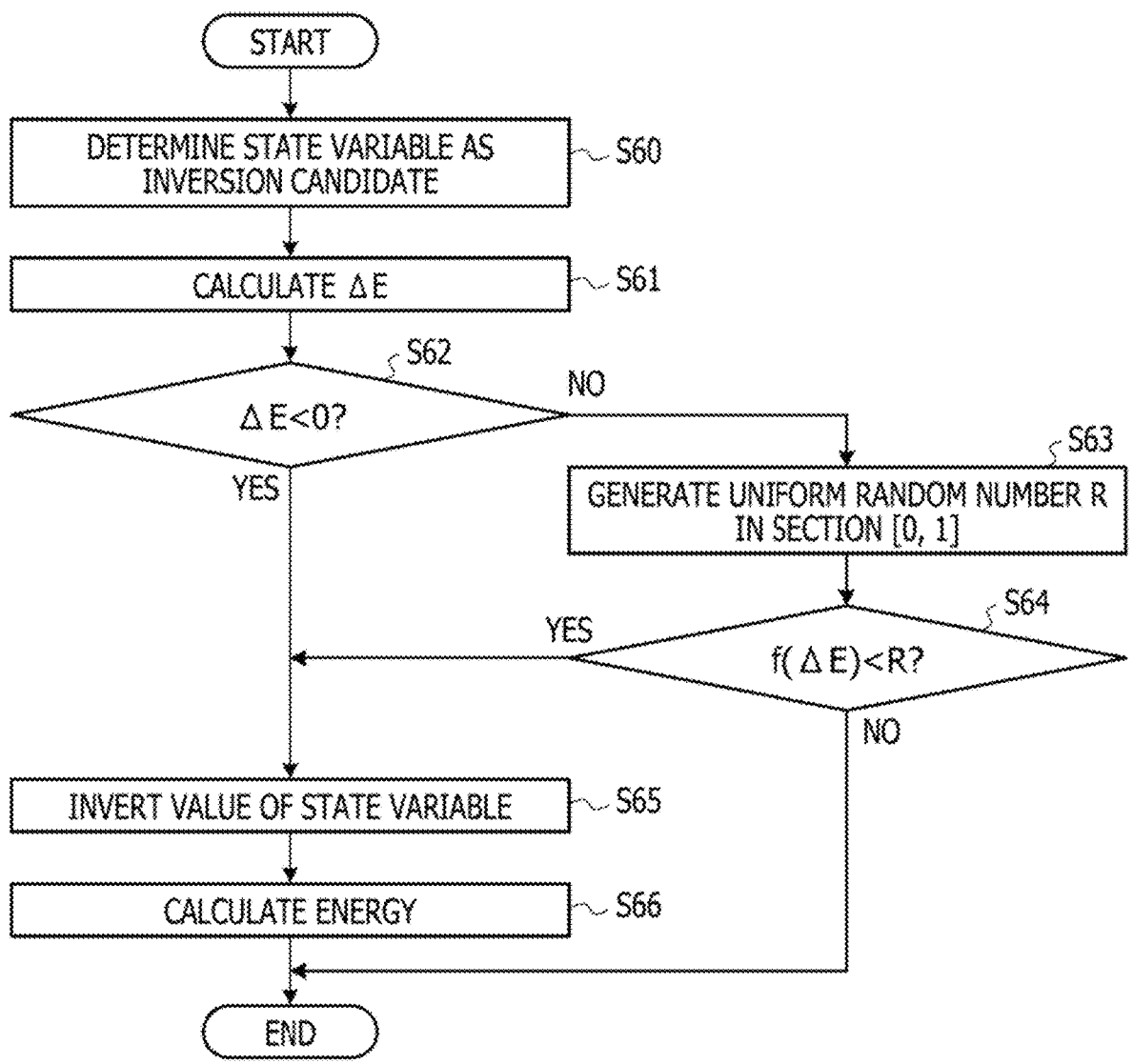
FIG. 8 is a flowchart illustrating a process flow of an example of an M-H calculation process.

FIG. 8 is a flowchart illustrating a process flow of an example of the M-H calculation process.

When the identification numbers of the N state variables are 1 to N, the random number generation unit 31f randomly generates integer values of 1 to N to determine a state variable as an inversion candidate (step S60).

Then, the energy difference calculation unit 31e calculates an energy difference ($\Delta E$) when inverting the value of the state variable as the inversion candidate (step S61). When the identification number of the state variable as the inversion candidate is k, the energy difference is $\Delta E_k = -(1-2x_k)h_k$. $h_k$ is a local field represented by equation (2).

The MCMC calculation execution unit 31h determines whether or not the energy difference calculated by the energy difference calculation unit 31e is smaller than 0 (step S62). When the MCMC calculation execution unit 31h determines that the energy difference is equal to or greater than 0, the MCMC calculation execution unit 31h (or the random number generation unit 31f) generates a uniform random number R in a section [0, 1] (step S63). Then, the MCMC calculation execution unit 31h determines whether or not the transition probability distribution (f($\Delta E$)) calculated by the transition probability calculation unit 31g is smaller than the uniform random number R (step S64).

When it is determined that f($\Delta E$)<R is true, or when it is determined that $\Delta E$<0 is true in the process of step S62, the MCMC calculation execution unit 31h inverts the value of the state variable of the inversion candidate (step S65). Thus, the spin information stored in the storage unit 30 is updated.

Noted that, in view of the application to developing of a concrete system, the above relationship between the transition probability distribution f(ΔE) and the random number R may be reversed. For example, the relationship to be evaluated in the process of step S64 may be adjusted such that if f(ΔE)>R is true then the MCMC calculation execution unit 31h inverts the value of the state variable of the inversion candidate (step S65).

Furthermore, the Hamiltonian calculation unit 31d calculates (updates) the energy using ΔE calculated in the process of step S61 (step S66).

When the MCMC calculation execution unit 31h determines that f(ΔE)≥R in the process of step S64, or after the process of step 66, the MCMC calculation execution unit 31h ends one M-H calculation process. As mentioned above, in view of the application to developing of a concrete system, the MCMC calculation execution unit 31h may be configured to ends one M-H calculation process when f(ΔE)≤R is true in the process of step S64.

Note that the process flow illustrated in FIG. 8 is an example. For example, the order of the processes of steps S65 and S66 may be exchanged.

Example of Energy Update Process

Figure 9:
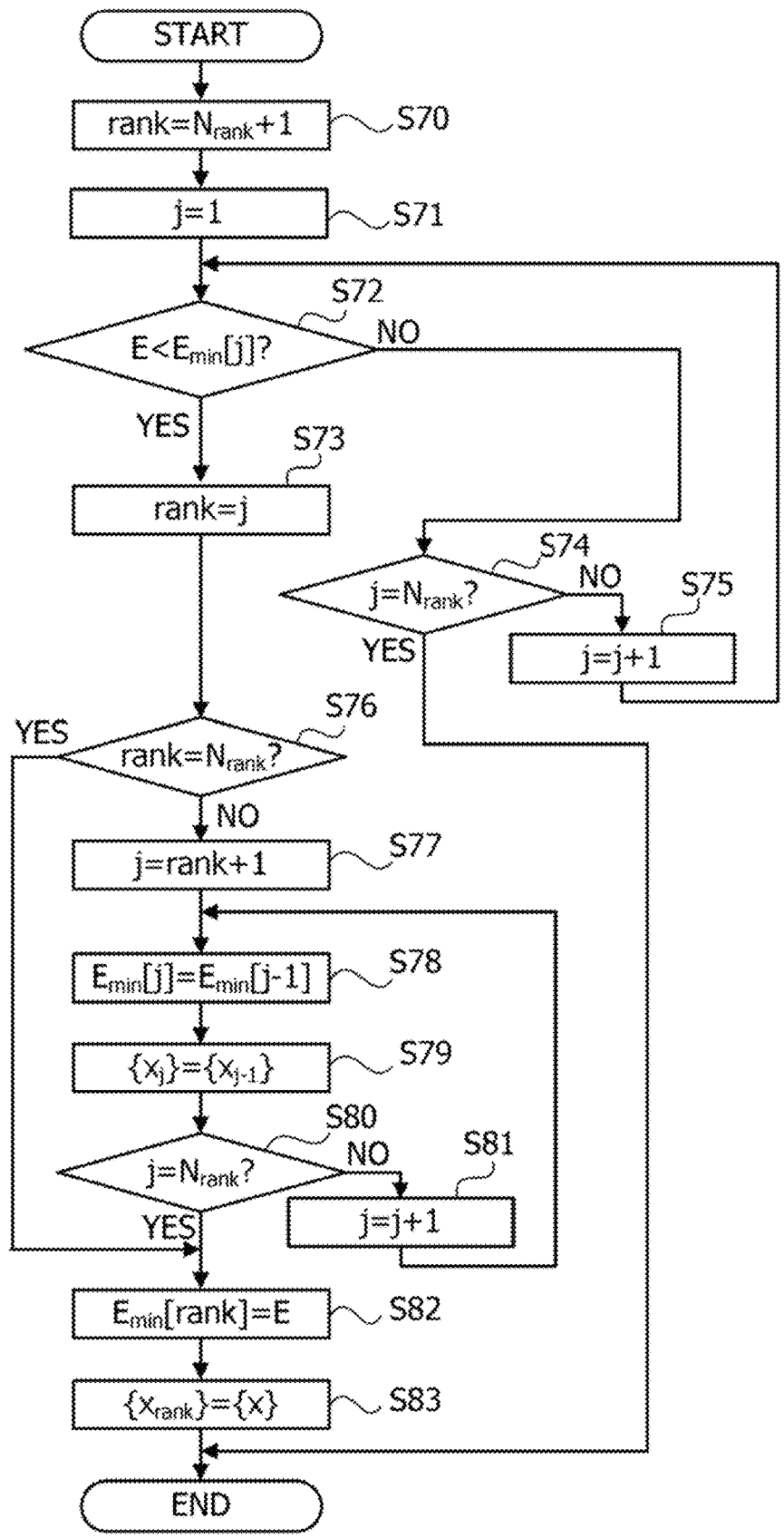
FIG. 9 is a flowchart illustrating a process flow of an example of an energy update process.

FIG. 9 is a flowchart illustrating a process flow of an example of the energy update process.

The energy update unit 31k initializes a rank indicating how small the energy (E) calculated by the Hamiltonian calculation unit 31d is to $N_{rank}+1$ among $N_{rank}$ pieces of energy stored in the storage unit 30 as the energy information (step S70).

Then, the energy update unit 31k sets j indicating the rank of the $N_{rank}$ pieces of energy to 1 (step S71), and then determines whether $E<E_{min}[j]$ is true or not (step S72). $E_{min}[j]$ represents the j-th smallest energy among the $N_{rank}$ pieces of energy.

When it is determined that $E<E_{min}[j]$ is true, the energy update unit 31k sets the rank=j (step S73). For example, when the energy calculated this time falls within the $N_{rank}$ pieces of energy (within the ranking), the rank is held as rank=j in, for example, the RAM 22.

When it is determined that $E≥E_{min}[j]$ is true, the energy update unit 31k determines whether or not $j=N_{rank}$ is true (step S74) and, when it is determined that $j=N_{rank}$ is not true, sets j=j+1 (step S75) and repeats the process from step S72.

When it is determined that $j=N_{rank}$ is true without any change of the rank=$N_{rank}+1$ (energy is out of the ranking), the energy update unit 31k ends the energy update process.

After the process of step S73, the energy update unit 31k determines whether or not the rank=$N_{rank}$ is true (step S76). When it is determined that the rank=$N_{rank}$ is not true, the energy update unit 31k sets j=rank+1 (step S77).

Then, the energy update unit 31k sets $E_{min}[j]=E_{min}[j-1]$ (step S78), and sets $\{x_j\}=\{x_{j-1}\}$ (step S79). $\{x_j\}$ indicates the value of each state variable corresponding to the j-th smallest energy.

Thereafter, the energy update unit 31k determines whether or not $j=N_{rank}$ is true (step S80) and, when it is determined that $j=N_{rank}$ is not true, sets j=j+1 (step S81) and repeats the process from step S78.

When it is determined that $j=N_{rank}$ is true or determined that the rank=$N_{rank}$ is true in the process of step S76, the energy update unit 31k sets $E_{min}[rank]=E$ (step S82), and $\{x_{rank}\}=\{x\}$ (step S83). Thus, the energy information stored in the storage unit 30 is updated. After the process of step S83, the energy update process ends.

Note that the process flow illustrated in FIG. 9 is an example. The order of the processes may be appropriately changed.

Example of Annealing Process

Figure 10:
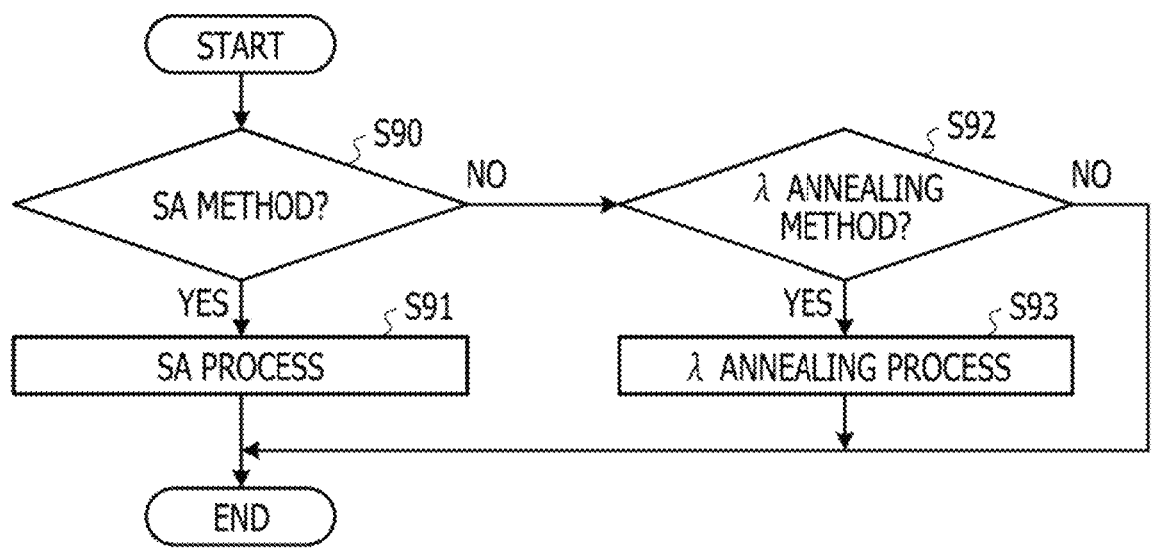
FIG. 10 is a flowchart illustrating a process flow of an example of an annealing process.

FIG. 10 is a flowchart illustrating a process flow of an example of an annealing process.

The control unit 31a determines whether or not the problem setting information read from the storage unit 30 includes information instructing to perform the SA method (step S90). When the control unit 31a has determined that the problem setting information includes information instructing to perform the SA method, the SA execution unit 31i performs an SA process (step S91). When it is determined that the problem setting information does not include the information instructing to perform the SA method, the control unit 31a determines whether or not the problem setting information includes information instructing to perform the λ annealing method (step S92). When the control unit 31a determines that the problem setting information includes the information instructing to perform the λ annealing method, the λ annealing unit 31m performs the λ annealing process (step S93).

After the process of steps S91 and S93, or when it is determined in the processing in step S92 that the problem setting information does not include the information instructing to perform the λ annealing method, the annealing process ends.

Example of SA Process

Figure 11:
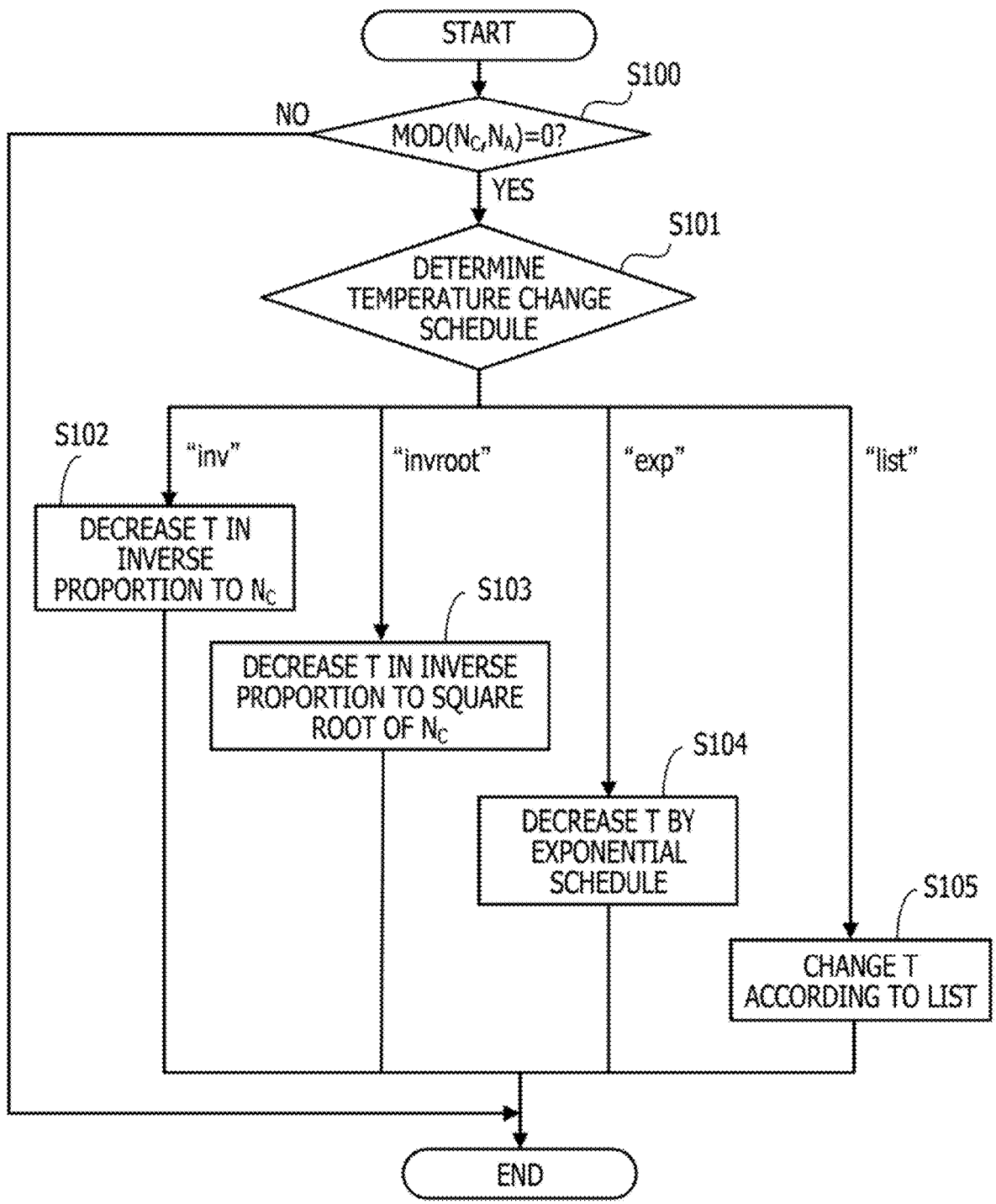
FIG. 11 is a flowchart illustrating a process flow of an example of an SA process.

FIG. 11 is a flowchart illustrating a process flow of an example of the SA process.

The SA execution unit 31i determines whether or not $MOD(N_C, N_A)=0$ is true (step S100). $N_C$ is the current number of calculations (number of steps), and $N_A$ is the number of steps indicating the frequency of annealing. In the process of step S100, it is determined whether or not $N_C$ is a multiple of $N_A$. When it is determined that $MOD(N_C, N_A)=0$ is not true, the SA execution unit 31i ends the SA process.

When it is determined that $MOD(N_C, N_A)=0$ is true, the SA execution unit 31i determines a temperature change schedule (step S101).

In the example of FIG. 11, four examples of the temperature change schedule are illustrated. "inv" is a temperature change schedule to reduce the temperature (T) in inverse proportion to $N_C$. "invroot" is a temperature change schedule to reduce the value of T in inverse proportion to the square root of $N_C$. "exp" is a temperature change schedule to reduce the value of T by an exponential schedule. "list" is a temperature change schedule to change (decrease) the value of T according to a list (a set of an arbitrarily given number of steps and the value of T).

When the temperature change schedule is "inv", the SA execution unit 31l decreases the value of T in inverse proportion to $N_C$ (step S102). When the temperature change schedule is "invroot", the SA execution unit 31i decreases the value of T in inverse proportion to the square root of $N_C$ (step S103). When the temperature change schedule is "exp", the SA execution unit 31i decreases T by an exponential schedule (step S104). When the temperature change schedule is "list", the SA execution unit 31i decreases the value of T according to the list (step S102). An arbitrary temperature change schedule may be set by using the list.

After the processes of steps S102 to S105, the SA process ends.

Example of λ Annealing Process

In the λ annealing method, $H(\lambda)=(1-\lambda)H_A+\lambda H_B$ is used as an energy function.

Further, $H_B$ is a Hamiltonian whose answer is desired, and for example, equation (1) is used. $H_A$ is a Hamiltonian in an initial state, a known Hamiltonian whose answer is well known. For example, in consideration of a one-dimensional arrangement of spins, it is assumed that interaction occurs only between adjacent spins, and all strengths of interaction are given as a constant value. In this manner, it is possible to create a state where an analytical solution exists in $H_A$. For example, as $H_A$, a Hamiltonian whose energy ($H(\lambda)$) is in the lowest state when the values of all spins (state variables) are 0 may be employed. Of course, a Hamiltonian whose energy is in the lowest state when the values of all the state variables are 1 may be employed as $H_A$. A manner of selecting $H_A$ depends on how the initial state is determined.

Further, λ (annealing variable) is $0 \leq \lambda \leq 1$, and can be defined as $\lambda=\lambda(t)$ as a function of time. However, $\lambda(t)$ satisfies a boundary condition of $\lambda(0)=0$ at a calculation start time ($t=0$) and $\lambda(\tau)=1$ at a calculation end time ($t=\tau$). Thus, the Hamiltonian as a function of time is $H(0)=H_A$ at the calculation start time, and $H(\tau)=H_B$ at the calculation end time.

Therefore, the calculation is started from a state in which all the state variables are initialized at t=0, and a Hamiltonian answer that the calculator desires to know is obtained at the end time of the calculation. Although this is a concept of the Ising-type quantum computer, the optimization device 20 does not deal with the quantum theory and uses the λ annealing method as a method of finding the minimum value of energy within the range of the classical Hamiltonian.

Figure 12:
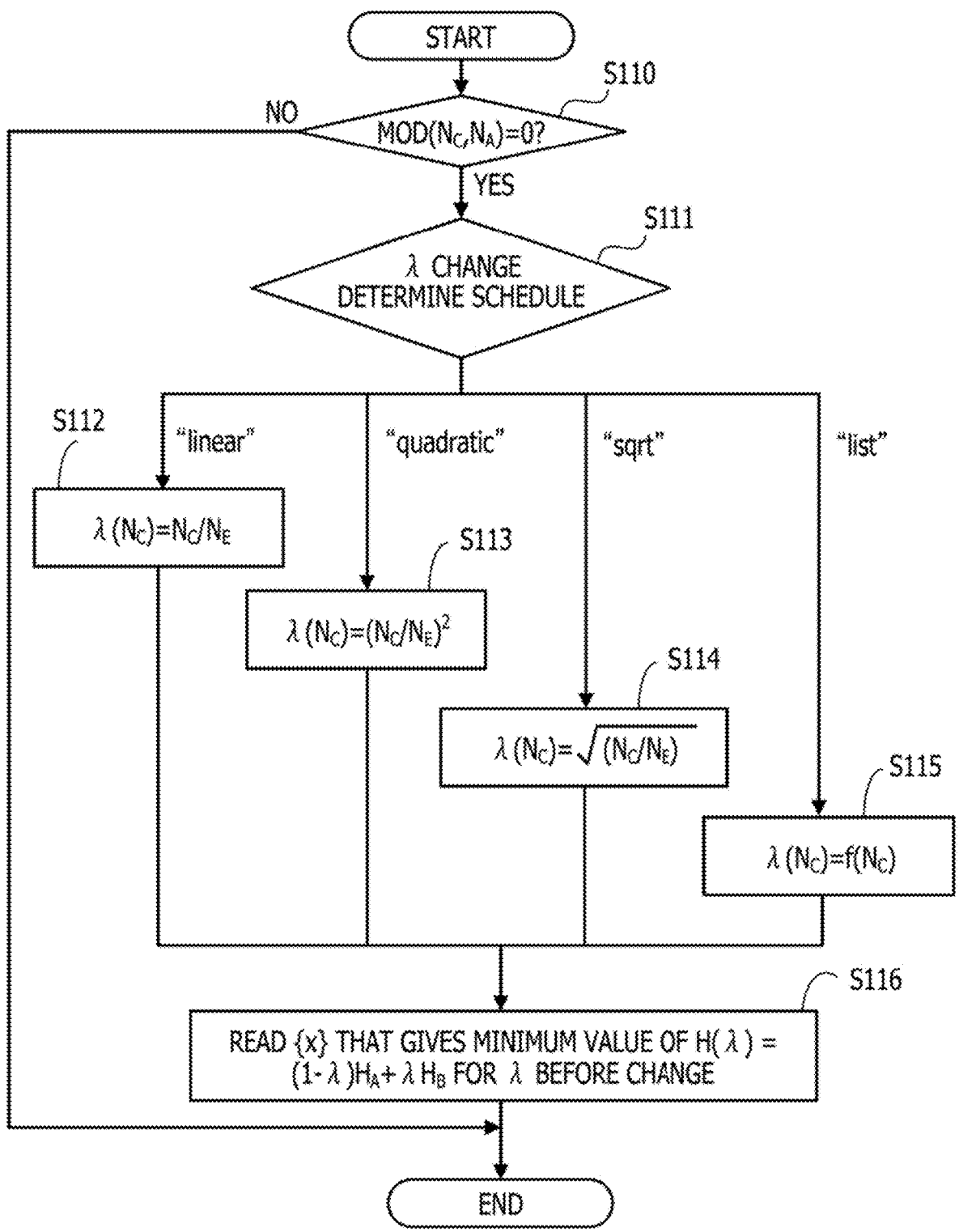
FIG. 12 is a flowchart illustrating a process flow of an example of a λ annealing process.

FIG. 12 is a flowchart illustrating a process flow of an example of the λ annealing process.

The λ annealing unit 31m determines whether or not $MOD(N_C, N_A)=0$ is true (step S110). $N_C$ is the current number of calculations (number of steps), and $N_A$ is the number of steps indicating the frequency of annealing. In the process of step S110, it is determined whether or not $N_C$ is a multiple of $N_A$. When it is determined that $MOD(N_C, N_A)=0$ is not true, the λ annealing unit 31m ends the λ annealing process.

When it is determined that $MOD(N_C, N_A)=0$ is true, the λ annealing unit 31m determines, for example, a λ change schedule included in the read problem setting information (step S111).

In the example of FIG. 12, four examples of the λ change schedule are illustrated. "linear" is a λ change schedule that increases $\lambda(N_C)$ with an increase of $N_C$ according to $\lambda(N_C)=N_C/N_E$. "quadratic" is a λ change schedule that increases $\lambda(N_C)$ with an increase of $N_C$ according to the square of ($N_C/N_E$). "sqrt" is a λ change schedule that increases $\lambda(N_C)$ with an increase of $N_C$ according to the square root of ($N_C/N_E$). "list" is a λ change schedule that increases $\lambda(N_C)$ according to a function called $f(N_C)$. $f(N_C)$ is arbitrary, but is given as a sequence of pairs ($N_i$, $\lambda_i$) based on the number of steps and the value of λ at the number of steps.

When the λ change schedule is "linear", the λ annealing unit 31m calculates $\lambda(N_C)$ by calculating $\lambda(N_C)=N_C/N_E$ (step S112). When the λ change schedule is "quadratic", the λ annealing unit 31m calculates $\lambda(N_C)$ by calculating the square of ($N_C/N_E$) (step S113). When the λ change schedule is "sqrt", the λ annealing unit 31m obtains $\lambda(N_C)$ by calculating the square root of ($N_C/N_E$) (step S114). When the λ change schedule is "list", the λ annealing unit 31m calculates $\lambda(N_C)$ according to the function $f(N_C)$ described above (step S115).

After the processes of steps S112 to S115, the λ annealing unit 31m reads from the storage unit 30 the value of each state variable that gives the minimum value of $H(\lambda)$ (for example, calculated by the Hamiltonian calculation unit 31d) for λ before the change (step S116). The read value of each state variable is used as an initial value when the M-H calculation process is performed again after the change of λ. After the process of step S116, the λ annealing processing ends.

Note that the λ annealing process can be performed simultaneously with the replica exchange process described below.

Example of Replica Exchange Process

Figure 13:
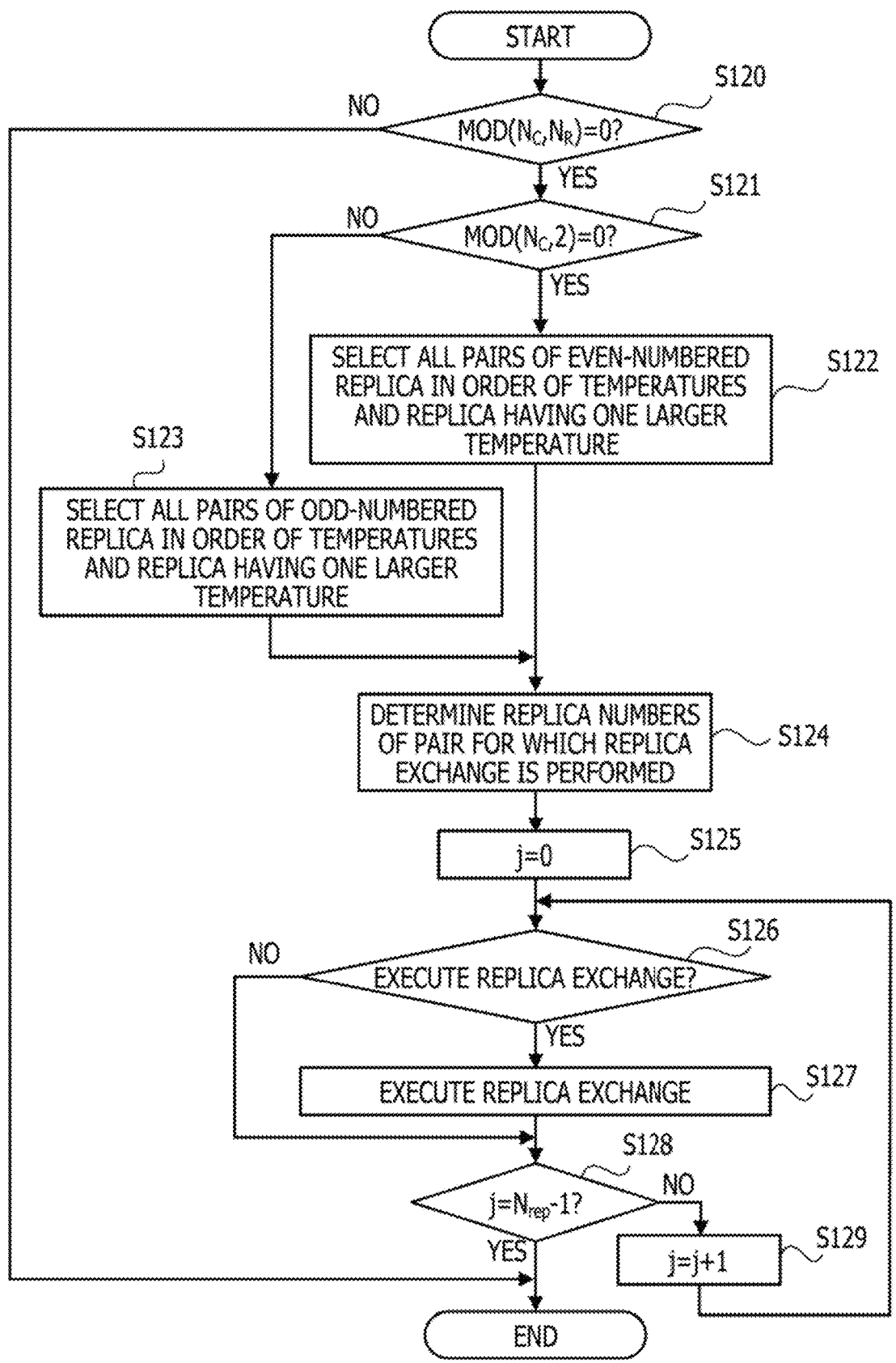
FIG. 13 is a flowchart illustrating a process flow of an example of a replica exchange process.

FIG. 13 is a flowchart illustrating a process flow of an example of the replica exchange process.

The replica exchange execution unit 31j determines whether or not $MOD(N_C, N_R)=0$ is true (step S120). $N_C$ is the current number of calculations (the number of steps), and $N_R$ is the number of steps indicating the frequency of replica exchange. In the process of step S120, it is determined whether or not $N_C$ is a multiple of $N_R$.

When it is determined that $MOD(N_C, N_R)=0$ is true, the replica exchange execution unit 31j determines whether or not $MOD(N_C, 2)=0$ is true (step S121). In the process of step S121, it is determined whether or not $N_C$ is an even number.

When it is determined that $MOD(N_C, 2)=0$ is true, the replica exchange execution unit 31j selects all pairs of an even-numbered replica in order of temperatures and a replica having one larger temperature (step S122). When it is determined that $MOD(N_C, 2)=0$ is not true, the replica exchange execution unit 31j selects all pairs of an odd-numbered replica in order of temperatures and a replica having one larger temperature (step S123). By determining a replica pair as a replica exchange candidate in this manner, the efficiency of replica exchange is increased.

After the processes of steps S122 and S123, the replica exchange execution unit 31j determines the replica number of a pair for which replica exchange is performed (step S124).

Figure 14:
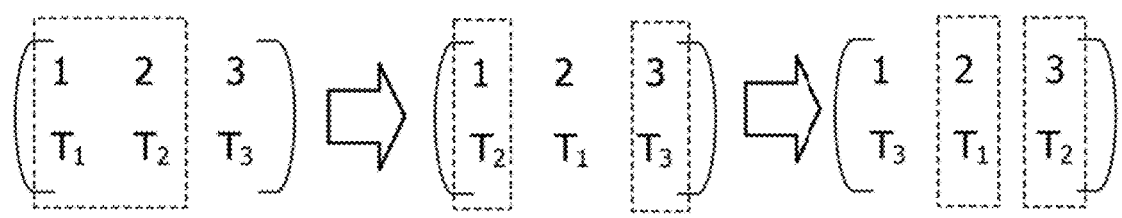
FIG. 14 is a diagram illustrating an example of a method for determining a replica number of a pair for which replica exchange is performed.

FIG. 14 is a diagram illustrating an example of a method for determining a replica number of a pair for which replica exchange is performed.

In FIG. 14, an upper part in parentheses indicates a replica number, and a lower part indicates a temperature set to the replica of the replica number. However, $T_1<T_2<T_3$. When temperatures are exchanged between replicas to be exchanged in replica exchange, the correspondence between the replica numbers and the temperatures changes. When the replica exchange is performed between adjacent replicas to which temperatures are set, in the process of step S124, replica numbers corresponding to adjacent temperatures ($T_i$ and $T_{i+1}$) are detected in order to detect such a replica.

In a leftmost side example in FIG. 14, replica numbers=1 and 2 corresponding to adjacent temperatures ($T_1$, $T_2$) are detected. When temperatures are exchanged between the replicas having the replica numbers of 1 and 2, as illustrated in a middle example of FIG. 14, there are two pairs of 1 and 2 and 1 and 3 of replica numbers corresponding to adjacent temperatures. Since the same temperatures have just been exchanged between the replica numbers=1 and 2, the replica numbers=1 and 3 are determined as the replica numbers of a pair for which the replica exchange is performed.

Note that although such a process is not needed when the values of state variables are exchanged between replicas, when the degree of freedom of the state variable increases, the amount of information generated by transmission and reception at the time of exchange increases, and it is desirable to exchange temperatures as described above.

Thereafter, the replica exchange execution unit 31*j* sets id (=0 to $N_{rep}-1$ ($N_{rep}$ is the number of pairs selected in steps S122 and S123)) of the pair for which the replica exchange is to be performed to 0 (step S125). Then, the replica exchange execution unit 31*j* determines whether or not to execute the replica exchange for the pair of id=j (step S126).

The exchange probability in the replica exchange method can be expressed by the following equation (18) when the transition probability distribution to be used satisfies the principle of detailed balance similarly to the Boltzmann distribution.

$$P_{A \to B} = \min\left\{1, \frac{P_B(t)}{P_A(t)}\right\} = \min\left\{1, \frac{\pi(\beta_i, \{x_j\})\pi(\beta_j, \{x_i\})}{\pi(\beta_i, \{x_i\})\pi(\beta_j, \{x_j\})}\right\} \quad (18)$$

In equation (18), $P_A(t)$ is a probability that a state A before the replica exchange is realized. In the state A, the state variable in the replica of the replica number=i to which $\beta_i$ is set follows a probability distribution $\pi(\beta_i, \{x_i\})$, and the state variable in the replica of the replica number=j to which $\beta_j$ is set follows a probability distribution $\pi(\beta_j, \{x_j\})$. $\beta_i$ and $\beta_j$ are inverse temperatures. In equation (18), $P_B(t)$ is a probability that a state B after the replica exchange is realized. In the state B, the state variable in the replica of the replica number=i to which $\beta_i$ is set follows a probability distribution $\pi(\beta_i, \{x_j\})$, and the state variable in the replica of the replica number=j to which $\beta_j$ is set follows a probability distribution $\pi(\beta_j, \{x_i\})$. Although equation (18) represents a case where the state variables $\{x_i\}$ and $\{x_j\}$ are exchanged between replicas with replica numbers=i and j, the same exchange probability $P_{A \to B}$ is used when $\beta_i$ and $\beta_j$ are exchanged.

On the other hand, when the transition probability distribution to be used does not satisfy the detailed balance, the exchange probability $P_{A \to B}$ is represented by the following equation (19).

$$P_{A \to B} = \min\left\{1, \frac{P_B(t)}{P_A(t)}\right\} = \min\{1, f(\beta_i \Delta E)\} \quad (19)$$

In equation (19), $\Delta E$ is $E_j - E_i$. For example, $\Delta E$ is the difference between energy in the replica with the replica number=j to which $\beta_j$ is set and energy in the replica with the replica number=i to which $\beta_i$ is set.

The reason for using equation (19) will be described. When the transition probability is defined by the above-described equation (9), as described above, a stochastic matrix having an eigenvalue of 1 is obtained, and a stationary Markov chain is formed. For example, the state converges to a stationary state. State density at the time of convergence to this stationary state becomes state density corresponding to the transition probability. Now, when all replicas are exchanged at the exchange probability of equation (19) at the time of replica exchange, the stationary state also exists in a system with all the replicas. When an extended ensemble method such as a replica exchange method is used, it is premised that a Markov chain forms a stationary state, and therefore, an exchange probability for obtaining a stationary state like equation (19) is used.

As $f(\beta_i \Delta E)$ in equation (19), a transition probability distribution as illustrated in equations (14) to (16) is used.

In the process of step S126, the replica exchange execution unit 31*j* determines whether or not to execute the replica exchange on a pair of id=j according to the exchange probability of equation (19). For example, based on a comparison result between $f(\beta_i \Delta E)$ in equation (19) and a uniform random number R satisfying 0≤R≤1, the replica exchange execution unit 31*j* determines to execute the replica exchange if $f(\beta_i \Delta E) < R$ is true. If $f(\beta_i \Delta E) < R$ is not true, the replica exchange execution unit 31*j* determines not to execute the replica exchange. Noted that, in view of the application to developing of a concrete system, the above relationship between the $f(\beta_i \Delta E)$ and the random number R may be reversed. For example, the relationship may be adjusted such that if $f(\beta_i \Delta E) > R$ is true then the replica exchange execution unit 31*j* determines to execute the replica exchange. In this case, the replica exchange execution unit 31*j* determines not to execute the replica exchange when $f(\beta_i \Delta E) > R$ is not true.

When it is determined to execute the replica exchange, the replica exchange execution unit 31*j* executes the replica exchange by exchanging temperatures between the replicas included in the pair of id=j (step S127).

When it is determined not to execute the replica exchange or after the process of step S127, the replica exchange execution unit 31*j* determines whether or not $j=N_{rep}-1$ is true (step S128). When it is determined that $j=N_{rep}-1$ is true, the replica exchange execution unit 31*j* ends the replica exchange process, or when it is determined that $j=N_{rep}-1$ is not true, j=j+1 is set (step S129), and the process from S126 is repeated.

Example of Sample Output Process

Figure 15:
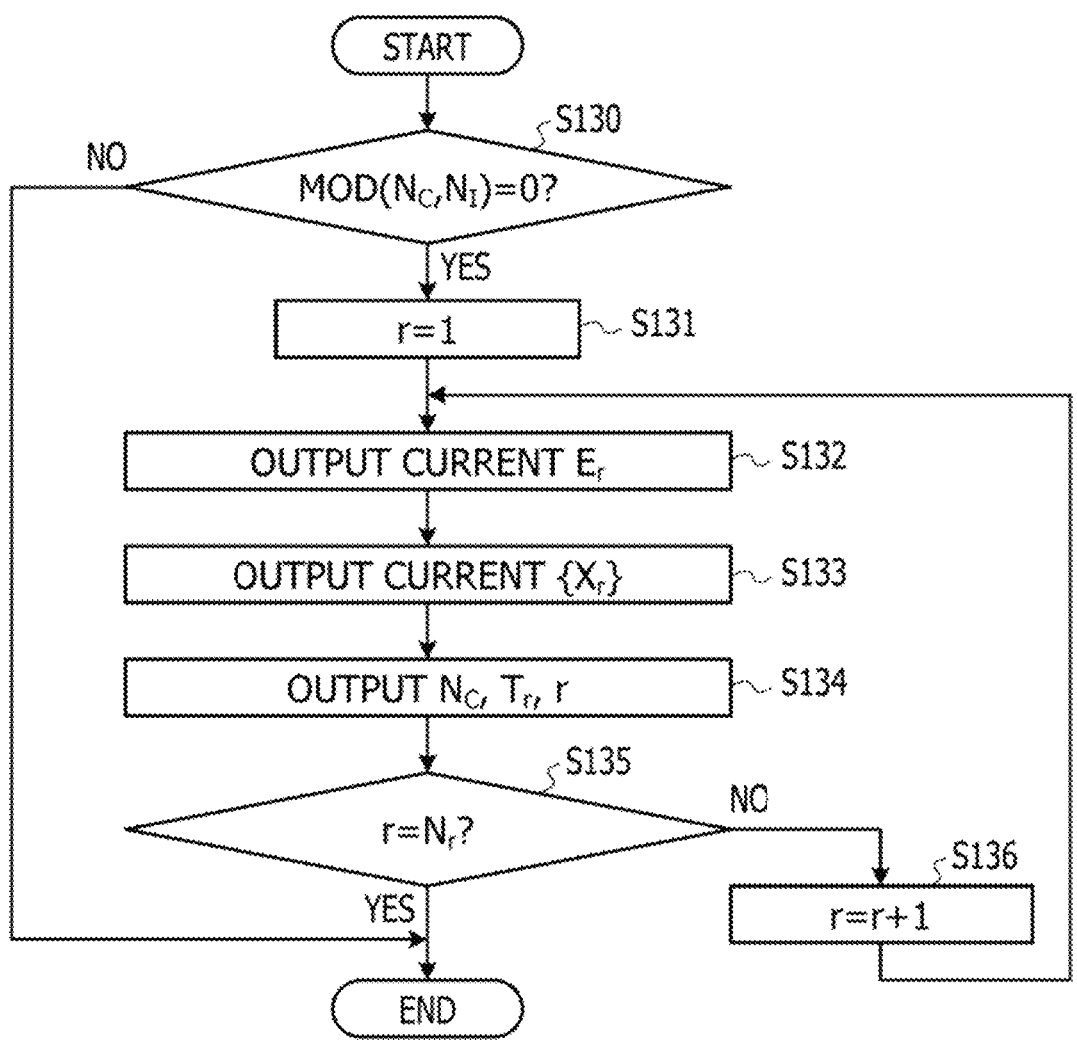
FIG. 15 is a flowchart illustrating a process flow of an example of a sample output process.

FIG. 15 is a flowchart illustrating a process flow of an example of a sample output process. FIG. 15 illustrates an example of the sample output process when the replica exchange process is performed.

The result output unit 31*l* determines whether or not $MOD(N_C, N_I)=0$ is true (step S130). $N_C$ is the current number of calculations (the number of steps), and $N_I$ is the number of steps indicating the sampling frequency. When the result output unit 31*l* determines that $MOD(N_C, N_I)=0$ is not true, the sample output process is ended.

When it is determined that $MOD(N_C, N_I)=0$ is true, the result output unit 31*l* sets the replica number (r) to 1 (step S131). After the process of step S131, the result output unit 31*l* outputs the current energy ($E_r$) of the replica having the replica number=r (step S132), and outputs the current value of each state variable ($\{x_r\}$) of the replica (step S133). Note that when the λ annealing method is performed, the result output unit 31*l* outputs H(λ) for each λ value as energy.

Moreover, the result output unit 31*l* outputs the $N_C$, the temperature ($T_r$) set to the replica having the replica number=r, and the replica number (r) (step S134).

Thereafter, the result output unit 31*l* determines whether or not $r=N_r$ is true (step S135). $N_r$ is the number of replicas. The result output unit 31*l* ends the sampling output process when it is determined that $r=N_r$ is true, or sets r=r+1 (step S136) and repeats the process from step S132 when it is determined that $r=N_r$ is not true.

(Parameter Optimization Process)

When heuristically finding a minimum value of energy, the calculator wants to know an optimum calculation result by a minimum number of calculations or a minimum time. However, depending on the transition probability distribution used, the solution may be trapped at a local minimum and may not escape easily. In this case, as a result, sampling may not be performed widely in an energy space (sampling efficiency deteriorates), and accuracy and speed of obtaining the minimum value or a next best solution deteriorates. For this reason, when calculating the minimum value solution problem, selection of the transition probability distribution is important.

Figure 16:
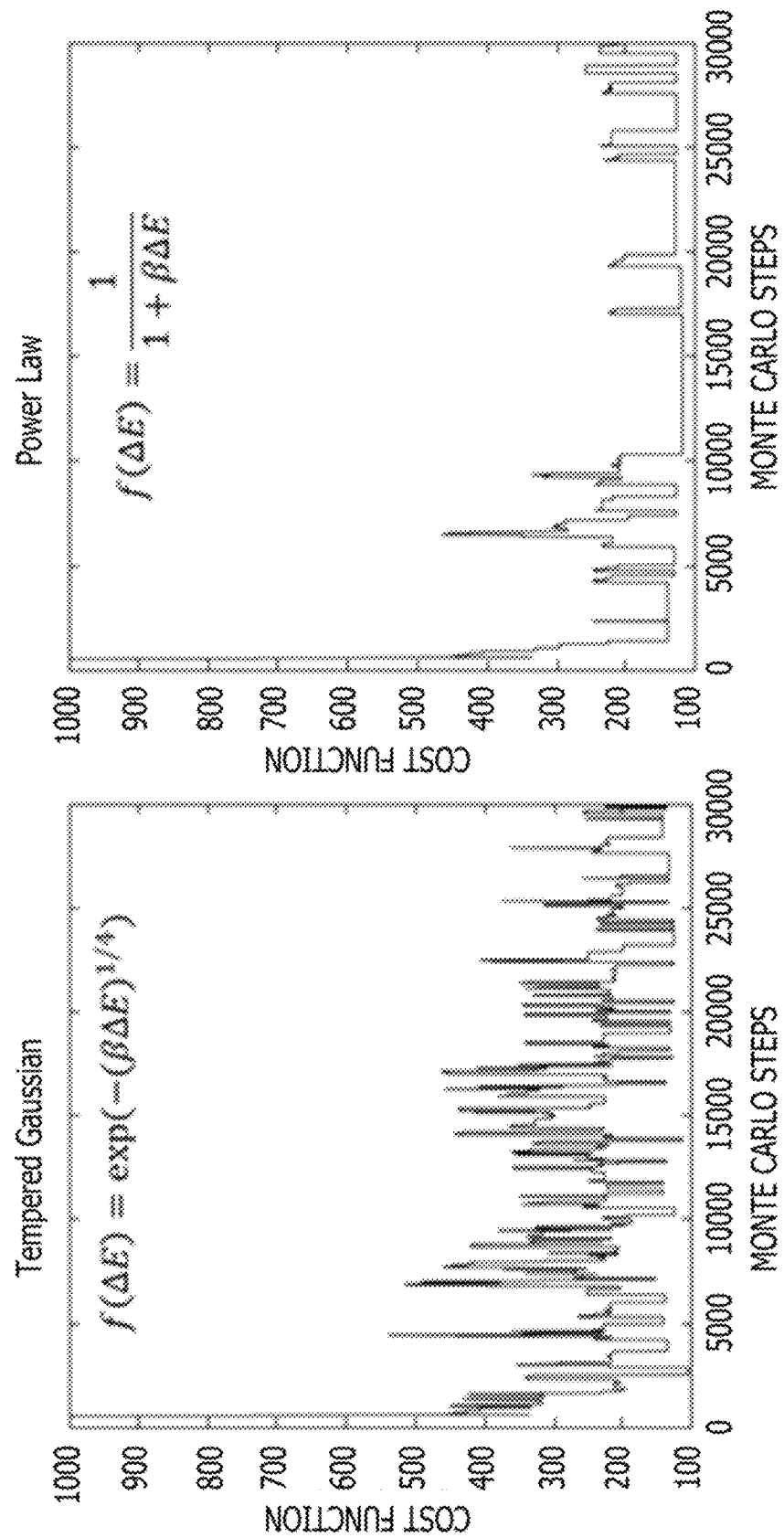
FIG. 16 is a diagram illustrating an example of comparing sampling results when two types of transition probability distributions are used.

FIG. 16 is a diagram illustrating an example of comparing sampling results when two types of transition probability distributions are used. On the left of FIG. 16, there is illustrated a sampling result when the transition probability distribution represented by equation (16) (hereinafter also referred to as a tempered Gaussian-type transition probability distribution) is used, in which $m_3=\frac{1}{4}$ is set. On the right of FIG. 16, there is illustrated a sampling result when the transition probability distribution represented by equation (14) (hereinafter also referred to as a power law-type transition probability distribution) is used, in which $m_1 \approx 1$ is set. However, in both the distributions, the temperature (absolute temperature) is set to 0.1.

The horizontal axis represents Monte Carlo Steps (corresponding to the number of steps described above), and the vertical axis represents Cost Function (corresponding to the above-described energy).

In the example of FIG. 16, a region where variance of sampling results is large (sampling range is wide) and energy is lower can be searched when the tempered Gaussian-type transition probability distribution is used.

However, changing parameters such as temperature can change the conclusion.

Figure 17:
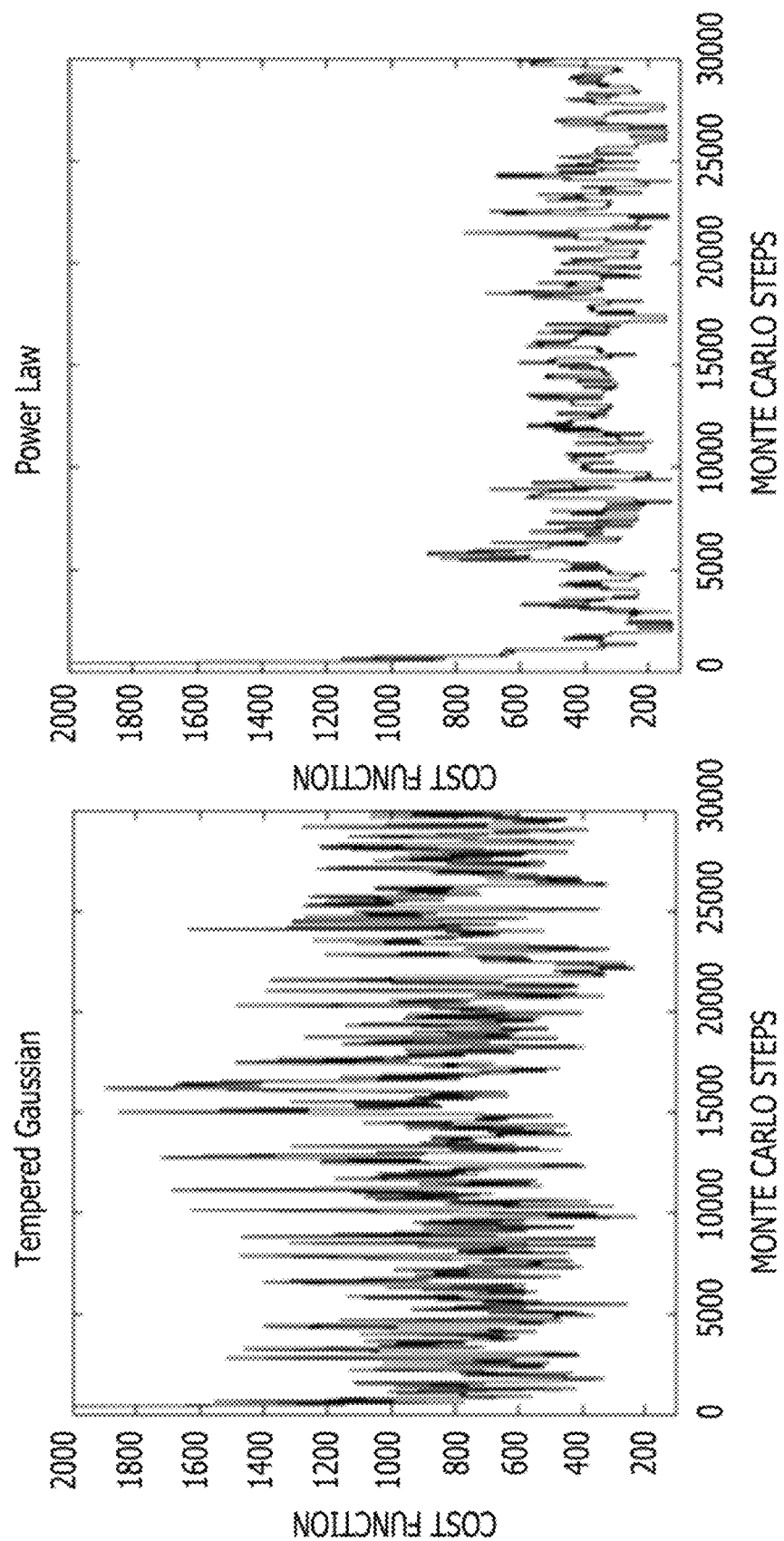
FIG. 17 is a diagram illustrating an example of comparing sampling results when two types of transition probability distributions with temperatures being changed are used.

FIG. 17 is a diagram illustrating an example of comparing sampling results when two types of transition probability distributions with temperatures being changed are used. FIG. 17 illustrates sampling results when the tempered Gaussian-type transition probability distribution and the power law-type transition probability distribution are used under the same conditions as in FIG. 16 except that the temperature is changed to 1.0.

When the temperature is set to 1.0, as illustrated in FIG. 17, a region where energy is lower can be searched when the power law-type transition probability distribution is used. On the other hand, variance of the sampling result is large when the tempered Gaussian-type transition probability distribution is used.

As described above, when calculating the minimum value solution problem, it is important to select an optimal transition probability distribution and to estimate optimal parameters.

On the other hand, procedures for selecting an optimal transition probability distribution and estimating optimal parameters are complicated. This is because many calculations are performed while changing the used transition probability distribution and parameters before performing a main calculation of the minimum value solution problem.

Accordingly, the parameter optimization unit $31n$ has a function to automatically estimate an optimal parameter included in the transition probability distribution as follows. Note that it is desirable that the automatic estimation function satisfies the following characteristics. For example, there are four characteristics such that the estimation can be performed by a brief preliminary calculation, the average value of energy at the time of sampling is small, variance of energy at the time of sampling is large, and the minimum value of energy is smaller.

Figure 18:
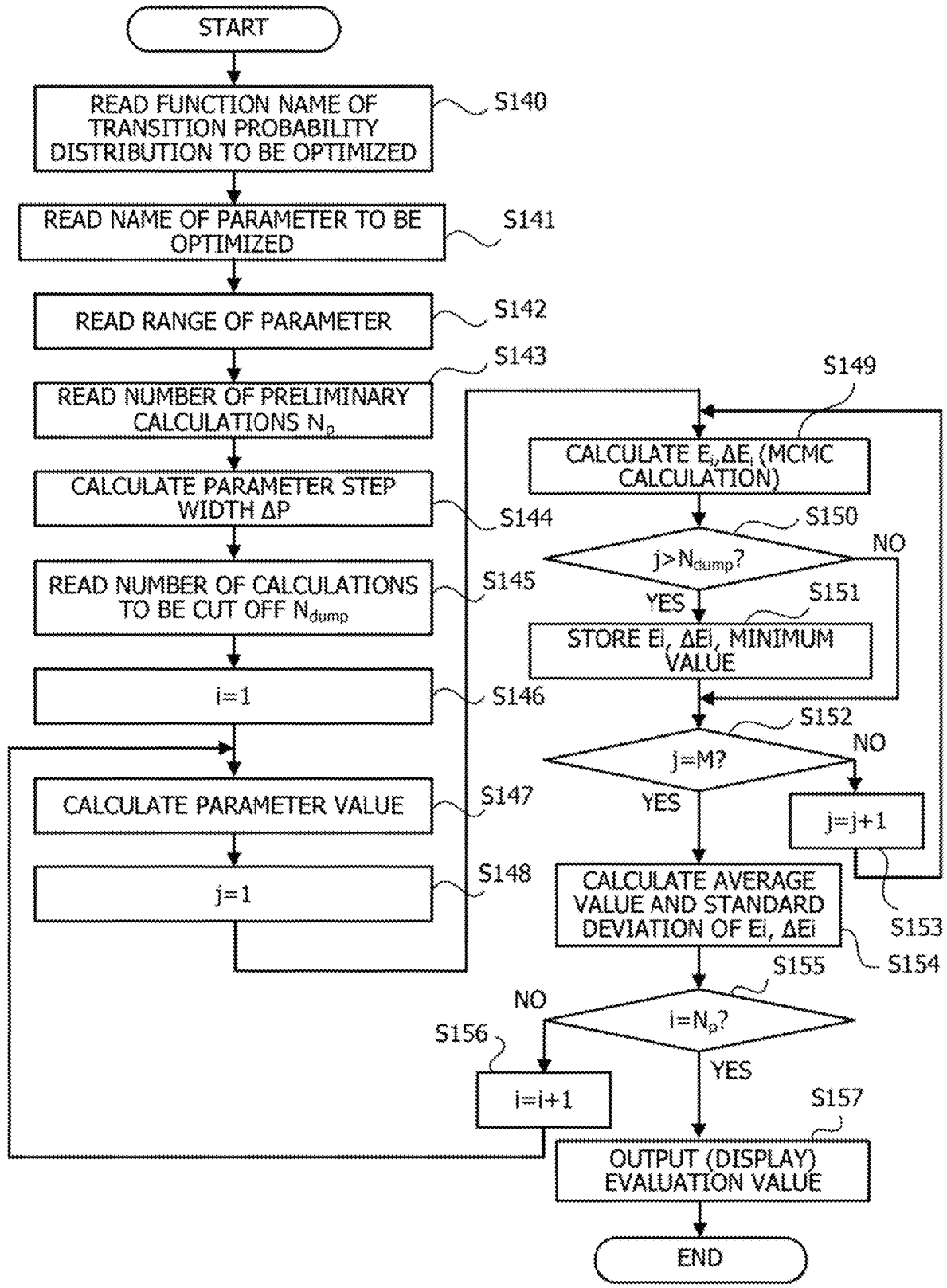
FIG. 18 is a flowchart illustrating a process flow of an example of a parameter optimization process.

FIG. 18 is a flowchart illustrating a process flow of an example of a parameter optimization process.

The parameter optimization unit $31n$ reads the function name of a transition probability distribution to be optimized from the storage unit 30 (step S140). For example, the function name of the transition probability distribution represented by equation (14) is specified as "Power law", the function name of the transition probability distribution represented by equation (15) is specified as "Hyperbolic", and the function name of the transition probability distribution represented by equation (16) is specified as "tempered Gaussian". Furthermore, when the transition probability distribution specified by the user is read, a function name such as "User-Defined" is specified. When reading the "User-Defined", the parameter optimization unit $31n$ also reads a combination of $(\Delta E_i, f(\Delta E_i))$ and smoothly connect each point by each combination so as to satisfy $0 \leq f(\Delta E_i) \leq 1$. At this time, the parameter optimization unit $31n$ can use, for example, a cubic spline. Note that the parameter optimization unit $31n$ sets $f(\Delta E_i)=0$ when a maximum value of $\Delta E_i$ is given and the read $\Delta E_i$ is larger than the maximum value.

Then, the parameter optimization unit $31n$ reads the name of a parameter to be optimized from the storage unit 30 (step S141). A parameter common to all the functions of the transition probability distributions is temperature (represented by an inverse temperature ($\beta=1/T$) in equations (14) to (16)), but in the cases of equations (14) to (16), $m_1$ to $m_3$ can also be selected as parameters to be optimized.

Moreover, the parameter optimization unit $31n$ reads the range for optimizing the parameter from the storage unit 30 (step S142). For example, when the parameter is temperature, minimum and maximum temperatures are read. Note that when a range different from the range stored in the storage unit is specified, for example, the range to be specified is input from the input device 25a. For example, when the parameter is temperature, the range is 0 or more because negative absolute temperature is not defined in the optimization device 20 of the present embodiment.

Next, the parameter optimization unit $31n$ reads the number of times of changing the parameter (number of preliminary calculations) $N_p$ from the storage unit 30 (step S143). Then, the parameter optimization unit $31n$ calculates a parameter step width $\Delta P$ (step S144). Assuming that the maximum value of the parameter is $P_{max}$ and the minimum value of the parameter is $P_{min}$, the parameter optimization unit $31n$ obtains $\Delta P$ by calculating, for example, $\Delta P=(P_{max}-P_{min})/(N_p-1)$. Note that the parameter optimization unit $31n$ may read a list indicating $\Delta P$ obtained by unequally dividing $P_{min}$ and $P_{max}$.

Thereafter, the parameter optimization unit $31n$ reads the number of calculations $N_{dump}$ to be cut off from the storage unit 30 (step S145). $N_{dump}$ is the number of calculations that determines a period called "burn-in" in the field of numerical statistics, and means the number of steps until the Markov chain converges to a stationary state. The number of burn-in steps differs depending on the problem to be calculated.

Note that in the description so far, the parameter optimization unit $31n$ reads various types of information from the storage unit 30, but may also display reading candidates on the display 24a illustrated in FIG. 3 and read information input by an operation of the input device 25a by the user.

After the process of step S145, the parameter optimization unit $31n$ sets i indicating the current number of preliminary calculations to 1 (step S146), and calculates a parameter value (step S147). In the process of step S147, the parameter optimization unit 31n calculates the value of the parameter ($P_i$) by calculating $P_i=P_{min}+(i-1)$.

Thereafter, the parameter optimization unit 31n sets j indicating the current number of MCMC calculations to 1 (step S148), and calculates energy ($E_i$) and energy difference ($\Delta E_i$) by the MCMC calculation (step S149).

Then, the parameter optimization unit 31n determines whether or not $j>N_{dump}$ is true (whether or not the number of calculations has exceeded the burn-in period) (step 150). When it is determined that $j>N_{dump}$ is true, the parameter optimization unit 31n stores $E_i$, $\Delta E_i$, and minimum value of energy in, for example, the RAM 22 illustrated in FIG. 3 (step S151).

When it is determined that $j>N_{dump}$ is not true (determined that the Markov chain has not reached the stationary state), or after the process of step S151, the parameter optimization unit 31n determines whether or not j=M is true (step S152). M is the number of times of MCMC calculation. If the value of M is taken too large, the preliminary calculation takes a long time. Thus, the number of times is specified that is larger than the number of calculations corresponding to the burn-in period, and that is needed for calculation of a statistic amount using data after cutting off the data until the burn-in period elapses. The amount of calculation for letting a Monte Carlo integration converge is proportional to 1/(square root of M), and thus the number of calculations to an extent that allows estimation is specified. For example, M is about 1000 to several million times, and is read from the storage unit 30. Thus, the calculation of an evaluation value described below is performed in a shorter time than the calculation time (main calculation time) when searching for the minimum value of the energy function.

When it is determined that j=M is not true, the parameter optimization unit 31n sets j=j+1 (step S153), and repeats the process from step S149. When it is determined that j=M is true, the parameter optimization unit 31n calculates an average value and a standard deviation of the stored $E_i$ and $\Delta E_i$ (step S154). Note that the calculated average value and standard deviation are stored together with the minimum value of energy, for example, in the RAM 22 as an evaluation value of a value of the energy function at a value of each parameter.

Thereafter, the parameter optimization unit 31n determines whether or not $i=N_p$ is true (step S155). When it is determined that $i=N_p$ is not true, the parameter optimization unit 31n sets i=i+1 (step S156), and repeats the process from step S147.

When it is determined that $i=N_p$ is true, the parameter optimization unit 31n outputs the stored evaluation value (step S157), and ends the parameter optimization process. The evaluation value is output (displayed) on the display 24a Illustrated in FIG. 3, for example. Note that the evaluation value may be output to the storage unit 30.

Note that the process flow illustrated in FIG. 18 is an example. The order of the processes may be appropriately changed.

FIG. 19 is a diagram illustrating an output example of evaluation values.

FIG. 19 illustrates a display example of evaluation values for the temperature on the display 24a. An example in which calculation is performed by $N_p=10$ from T=1 to 10 is illustrated. The minimum value of energy ($E_{min}$), average value of energy ($E_{ave}$), standard deviation of energy ($E_{stddev}$), average value of energy difference ($dE_{ave}$), and standard deviation of energy difference ($dE_{stddev}$) for each temperature are listed as evaluation values. Furthermore, in the example of FIG. 19, respective temperatures are ranked in ascending order of $E_{min}$. When $N_p$ increases, the data amount of the calculation result increases. Thus, ranking the values of respective parameters as described above makes it easy to determine the values of good parameters and allows reducing the analysis time. Note that the ranking is not limited to being performed in ascending order of $E_{min}$, and may be performed in ascending order of $E_{ave}$.

By performing the parameter optimization process as described above, labor of the calculator in determining parameters is reduced, and parameters that can be expected to obtain good calculation results can be easily determined.

(Effects)

Also in the optimization device 20 of the second embodiment as described above, the following effects similar to those of the optimization device of the first embodiment may be obtained.

For example, since a transition probability distribution in which a transition probability when $\Delta E$ is (positively) large is larger than the Boltzmann distribution is applied, a solution can escape from a local solution with high efficiency. Furthermore, since it is not a method of adding an offset to energy as in the dynamic offset method, the Markov chain may not be broken. From the above, it is possible to efficiently search for a minimum value of an energy function without breaking the Markov chain.

Moreover, the optimization device 20 employs an exchange probability using the transition probability distribution as described above at the time of the replica exchange process, and thus a replica exchange frequency is higher than when the Boltzmann distribution is used. Thus, even when the number of replicas is small, each replica randomly walks in the temperature space. Consequently, the sampling space is expanded, sampling efficiency is improved, and a more accurate solution can be obtained.

Furthermore, in the energy update process illustrated in FIG. 9, the optimization device 20 updates energy information so that energy calculated so far includes $N_{rank}$ pieces of energy in ascending order from the minimum value. Therefore, even when a true minimum value of the energy function may not be obtained, a next best minimum value (solution) can be obtained.

Calculation Example

Hereinafter, in order to illustrate the above effects, a calculation example of the traveling salesman problem by the optimization device 20 will be described.

The traveling salesman problem is a problem to find the minimum distance of a journey such that, when N cities are defined as points $P_i$ (i=1, ..., N), a salesman visits each city exactly once and finally returns to the first city. Here, a distance $d_{ij}$ between points $P_i$ and $P_j$ represents a distance between cities. In order to convert the traveling salesman problem into an Ising model, if a state variable indicating whether or not to visit a city a in the i-th place is $n_{i,a}$, the Ising-type energy function (E) having $N^2$ state variables can be expressed as the following equation (20).

$$E = \tfrac{1}{2}\Sigma_{i,j,a}^{N} d_{ij} n_{i,a}(n_{j,a+1}+n_{j,a-1}) \quad (20)$$

However, if equation (20) remains as it is, a self-evident solution where the salesman does nothing (all state variables are 0) and even an unrealistic solution where the salesman visits all cities in the i-th place are tolerated, and thus constraint conditions represented by the following equations (21) and (22) are imposed.

$$\Sigma_{a=1}^{N} n_{i,a} = 1 \quad (21)$$

$$\Sigma_{i=1}^{N} n_{i,a} = 1 \quad (22)$$

The following equation (23) taken into equation (20) using the constraint conditions expressed by equations (21) and (22) as penalty terms is an equation to be subjected to energy minimization.

$$E = 1/1 \Sigma_{i,j,a}^{N} d_{ij} n_{i,a} (n_{j,a+1} + n_{j,a-1}) + k_1 \Sigma_{i=1}^{N} (\Sigma_{a=1}^{N} n_{i,a} - 1)^2 + k_2 \Sigma_{a=1}^{N} (\Sigma_{j=1}^{N} n_{i,a} - 1)^2 \quad (23)$$

In equation (23), $k_1$ and $k_2$ are constants representing the magnitude of a penalty. By setting the magnitude of a penalty larger than the minimum value of energy, a self-evident solution or an unreal solution obtained has large energy and is removed from solution candidates.

Note that equation (23) is calculated after being converted into, for example, the format illustrated in equation (1). $k_1$ and $k_2$ are reflected on the weighting factor ($W_{ij}$).

The traveling salesman problem as described above is employed as a problem to be calculated for the following reasons. The first reason is that the traveling salesman problem is not a physics problem and does not need to be tied to the Boltzmann distribution. Further, the second reason is that the traveling salesman problem can be converted into an Ising model. Furthermore, the third reason is that in equation (23), strengths of interaction of second-order terms are scattered, and an interaction between distant spins (between state variables) is also strong. Moreover, the fourth reason is that since the constraint condition is included in equation (23) as a penalty term, it is ideal as an Ising model with a penalty (Ising model with an external field).

Figure 20:
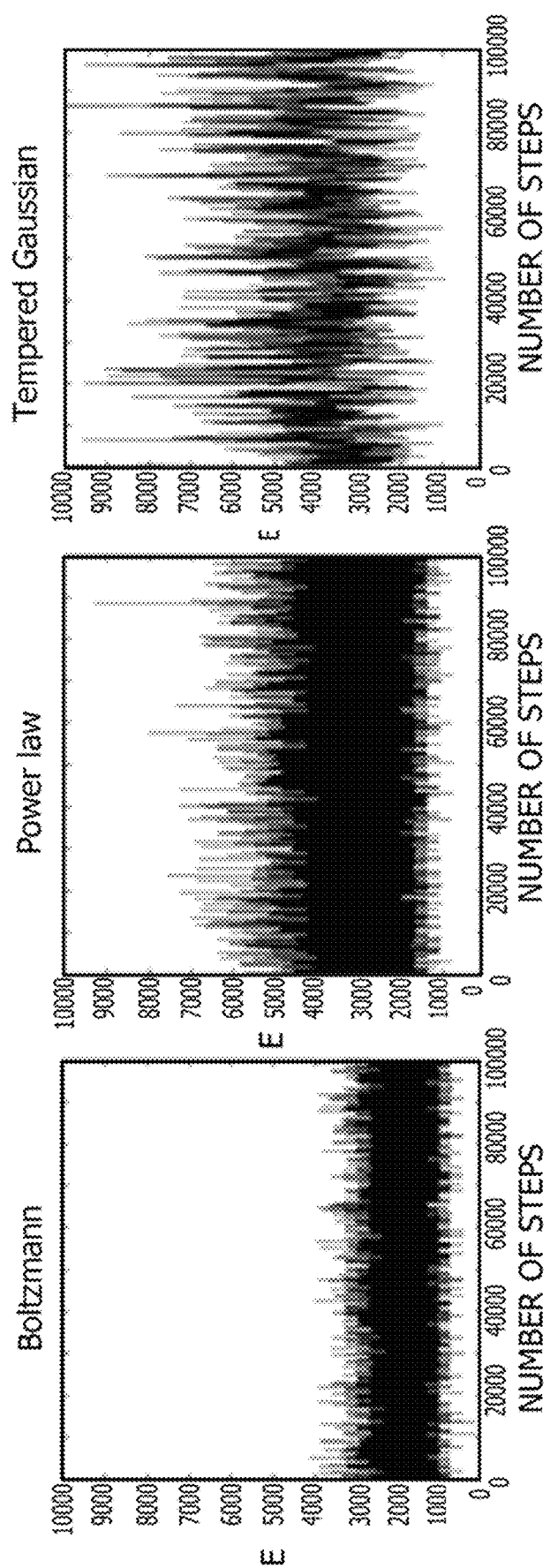
FIG. 20 is a diagram illustrating an example of a stationary state calculation result when three types of transition probability distributions are used.

FIG. 20 is a diagram illustrating an example of stationary state calculation results when three types of transition probability distributions are used. The horizontal axis represents the number of steps, and the vertical axis represents energy (E). FIG. 20 illustrates, from the left, sampling results when the Boltzmann distribution, the power law-type transition probability distribution, and the tempered Gaussian-type transition probability distribution are used as the transition probability distribution.

The traveling salesman problem used is ulysees16 of TSPLIB (TSPLIB, [online], [searched on Apr. 11, 2019], Internet <URL: https://www.iwr.uni-heidelberg.de/groups/comopt/software/TSPIB95/>). Note that calculation conditions are: T=100.0, $k_1$ and $k_2$ in equation (23) are 150, $N_E$=100,000, $N_F$=10, $m_1$ in equation (14) is 1.02, and $m_3$ in equation (16) is 0.25.

As illustrated in FIG. 20, when the power law-type and tempered Gaussian-type transition probability distributions are used, it can be seen that convergence to a stationary state occurs by repeating the Markov chain, similarly to when the Boltzmann distribution is used. Moreover, the search range for energy is about [1000, 4000] when the Boltzmann distribution is used, but expands to about [1000, 9000] in the power law-type transition probability distribution. The same applies when the tempered Gaussian-type transition probability distribution is used.

Figure 21:
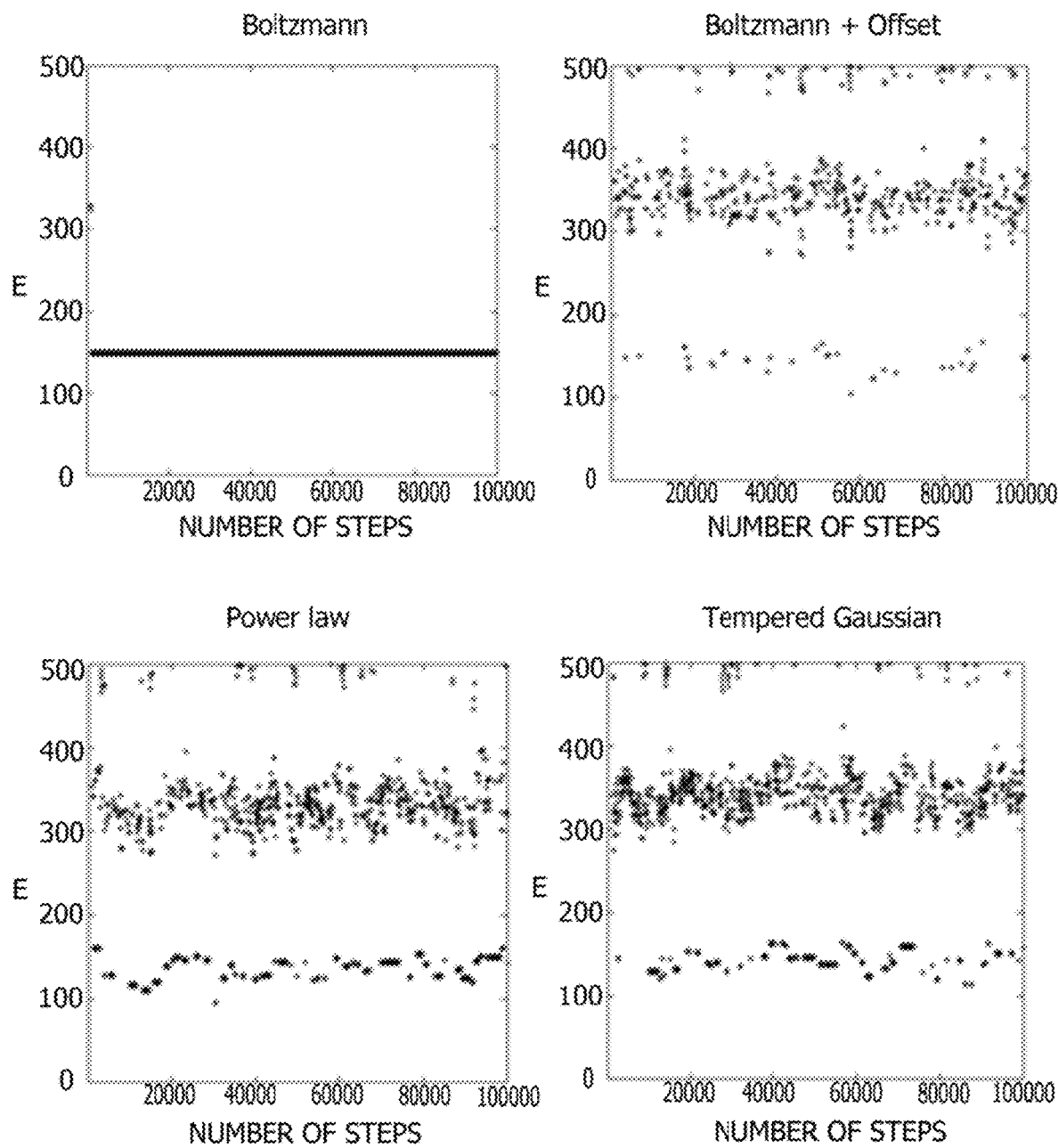
FIG. 21 is a diagram illustrating an example of comparing search performance.

FIG. 21 is a diagram illustrating an example of comparing search performance. The horizontal axis represents the number of steps, and the vertical axis represents energy (E). FIG. 21 illustrates a sampling result when the Boltzmann distribution is used as the transition probability distribution (upper left), and a sampling result by a method using the Boltzmann distribution as the transition probability distribution and adding an offset to energy (dynamic offset method) (upper right). Moreover, a sampling result when the power law-type transition probability distribution is used as the transition probability distribution (lower left) and a sampling result when the tempered Gaussian-type transition probability distribution is used (lower right) are illustrated.

The traveling salesman problem used is ulysees16 similarly to the above, and calculation conditions are: T=0.25, $k_1$ and $k_2$ in equation (23) are 150, $N_E$=200,000, $N_F$=10, $m_1$ in equation (14) is 1.02, and $m_3$ in equation (16) is 0.25. Note that in the calculation of the dynamic offset method, when the same state is continuously maintained 50 times, it is considered that a solution has fallen to the local minimum, and the offset is added.

As is clear from FIG. 21, when the Boltzmann distribution is used as the transition probability distribution without using the offset, once a solution falls into a local minimum, the solution does not come out of the local minimum. When the dynamic offset method is applied, the solution can easily come out of the local minimum, but there are only few points in an energy region that is desired to be known as the solution (there are few good solutions). On the other hand, when the power law-type transition probability distribution or the tempered Gaussian-type transition probability distribution is used, it is possible to escape from the local minimum and find many solutions in a lower energy region.

Thus, it can be seen that when the power law-type or tempered Gaussian-type transition probability distribution is used, the search performance improves compared to when the Boltzmann distribution is used or when the dynamic offset method using the Boltzmann distribution is applied.

Moreover, when the power law-type or tempered Gaussian-type transition probability distribution is used, an extended ensemble method such as a replica exchange method can be applied as it is because it is not a method of adding an offset to energy and does not break the Markov chain.

Hereinafter, calculation examples when the replica exchange method is performed using the Boltzmann distribution as the transition probability distribution and when the replica exchange method is performed using the power law-type transition probability distribution will be described. The traveling salesman problem used is ulysees16 as above, and calculation conditions are: $k_1$ and $k_2$ in equation (23) are 150, $N_E$=200,000 (for every replica), $N_F$=10, and $m_1$ in equation (14) is 1.02. Note that the number of replicas is eight, and a temperature sequence set to respective replicas is T=1.0, 3.0, 5.0, 10.0, 15.0, 20.0, 25.0, 30.0.

Figure 22:
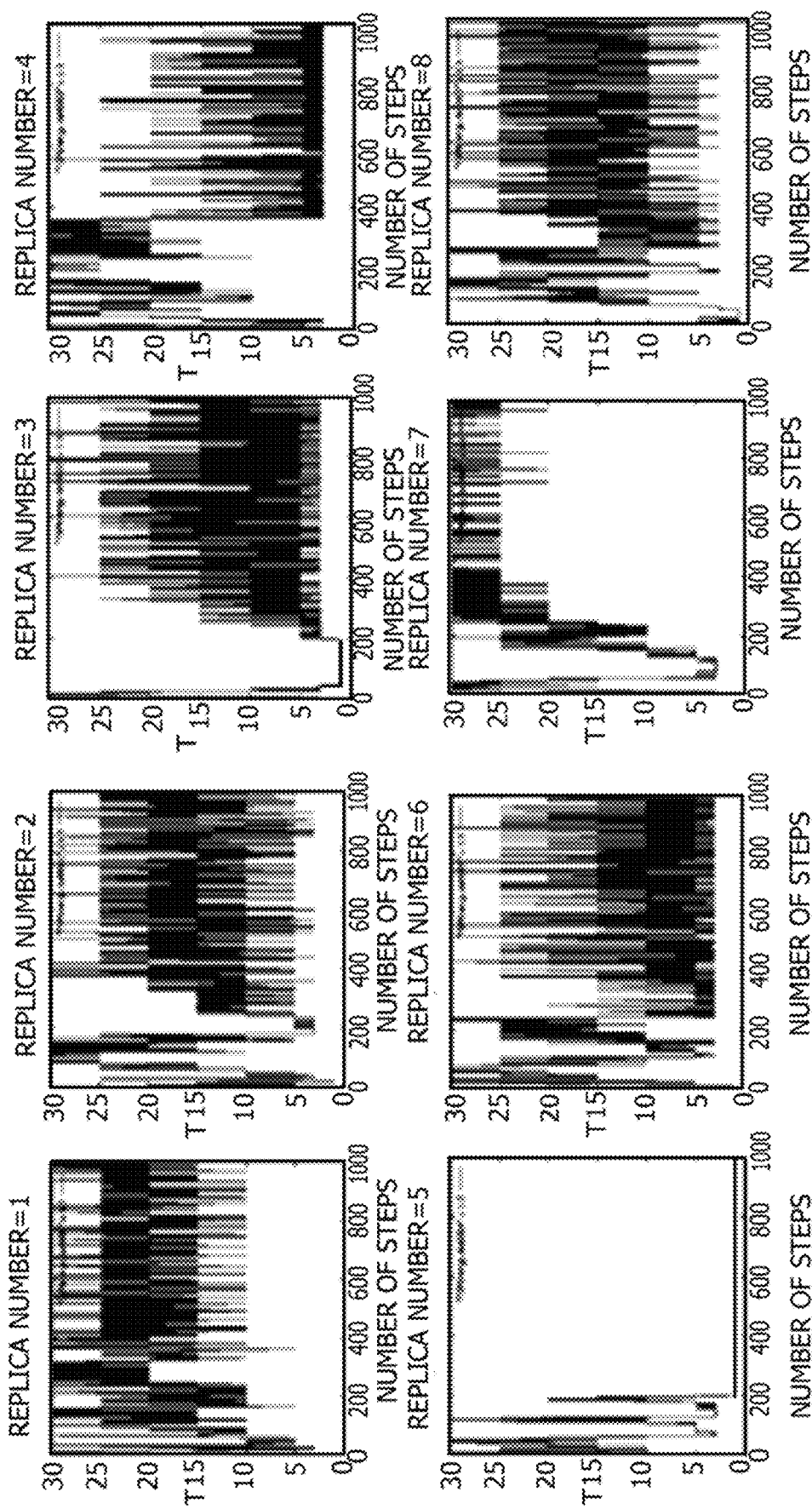
FIG. 22 is a diagram illustrating an example of calculation results of temperature transitions in respective replicas when the Boltzmann distribution is used.

FIG. 22 is a diagram illustrating an example of calculation results of temperature transitions in respective replicas when the Boltzmann distribution is used. FIG. 22 illustrates a calculation result of transition of temperature (T) in each of the eight replicas with replica numbers=1 to 8. The horizontal axis represents the number of steps, and the vertical axis represents T, which represents a positive real number.

As illustrated in FIG. 22, it can be seen that when the Boltzmann distribution is used, each replica may not be said to be randomly walking in the temperature space with an equal probability. For example, for the replica with a replica number=5, the number of steps is fixed at T=1.0 from around 200.

Figure 23:
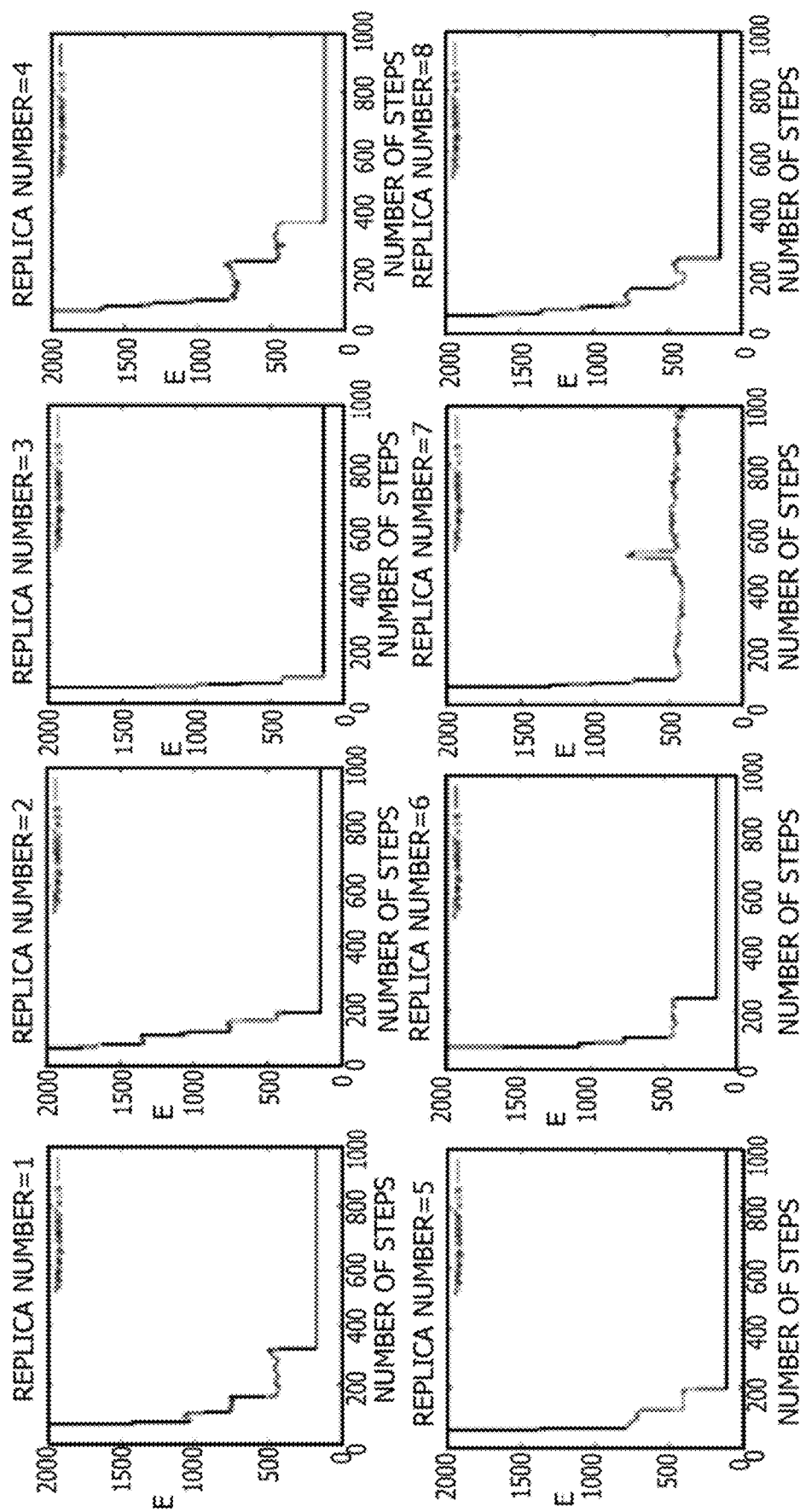
FIG. 23 is a diagram illustrating an example of calculation results of energy in the respective replicas when the Boltzmann distribution is used.

FIG. 23 is a diagram illustrating an example of calculation results of energy in respective replicas when the Boltzmann distribution is used. FIG. 23 illustrates calculation results of energy (E) in each of the eight replicas with replica numbers=1 to 8. The horizontal axis represents the number of steps, and the vertical axis represents energy (E).

As Illustrated in FIG. 23, it can be seen that when the Boltzmann distribution is used, energy of most replicas is constrained to a local minimum and may not escape.

Figure 24:
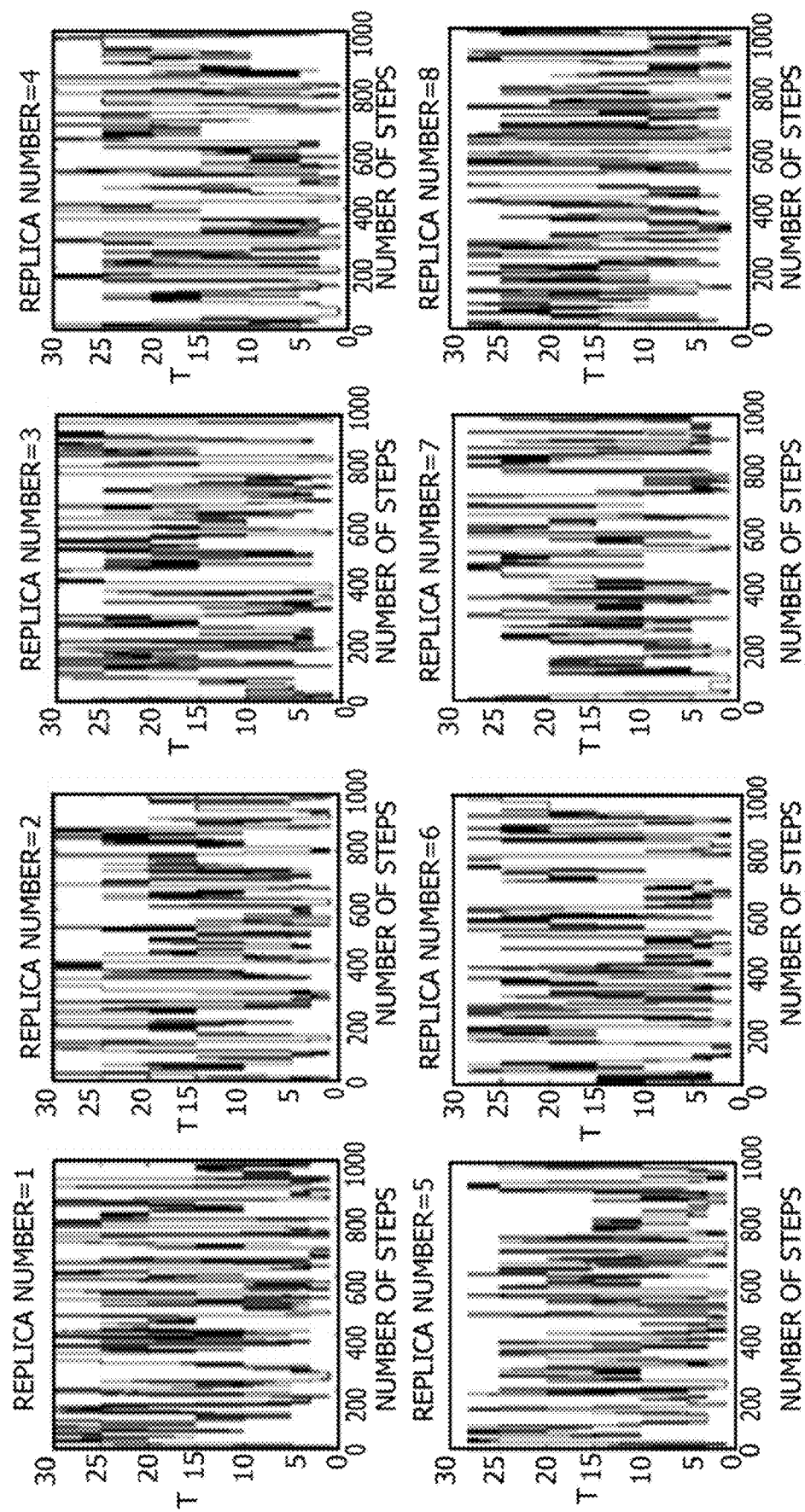
FIG. 24 is a diagram illustrating an example of calculation results of temperature transitions in the respective replicas when a power law-type transition probability distribution is used.

FIG. 24 is a diagram illustrating an example of calculation results of temperature transitions in the respective replicas when the power law-type transition probability distribution is used. FIG. 24 illustrates calculation results of transitions of temperatures (T) in the eight respective replicas with replica numbers=1 to 8. The horizontal axis represents the number of steps, and the vertical axis represents T, which represents a positive real number.

As Illustrated in FIG. 24, it can be seen that when the power law-type transition probability distribution is used, each temperature is set with almost equal probability in each of the replicas, and each of the replicas randomly walks in the temperature space.

Figure 25:
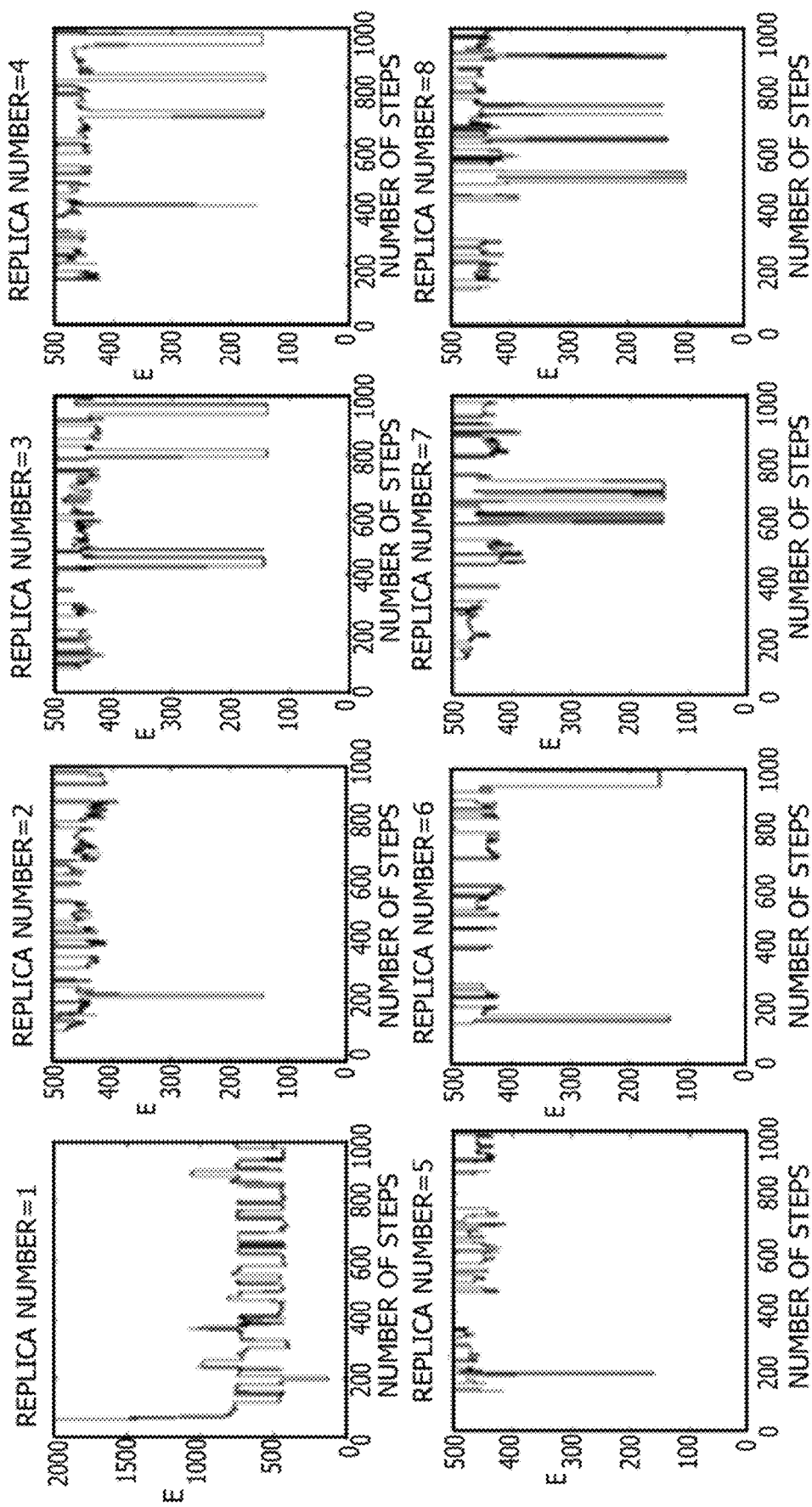
FIG. 25 is a diagram illustrating an example of calculation results of energy in the respective replicas when the power law-type transition probability distribution is used.

FIG. 25 is a diagram illustrating an example of calculation results of energy in the respective replicas when the power law-type transition probability distribution is used. FIG. 25 illustrates calculation results of energy (E) in each of the eight replicas with replica numbers=1 to 8. The horizontal axis represents the number of steps, and the vertical axis represents energy (E).

As illustrated in FIG. 25, it can be seen that when the power law-type transition probability distribution is used, energy of each replica can easily escape when the energy falls into a specific local minimum.

Figure 26:
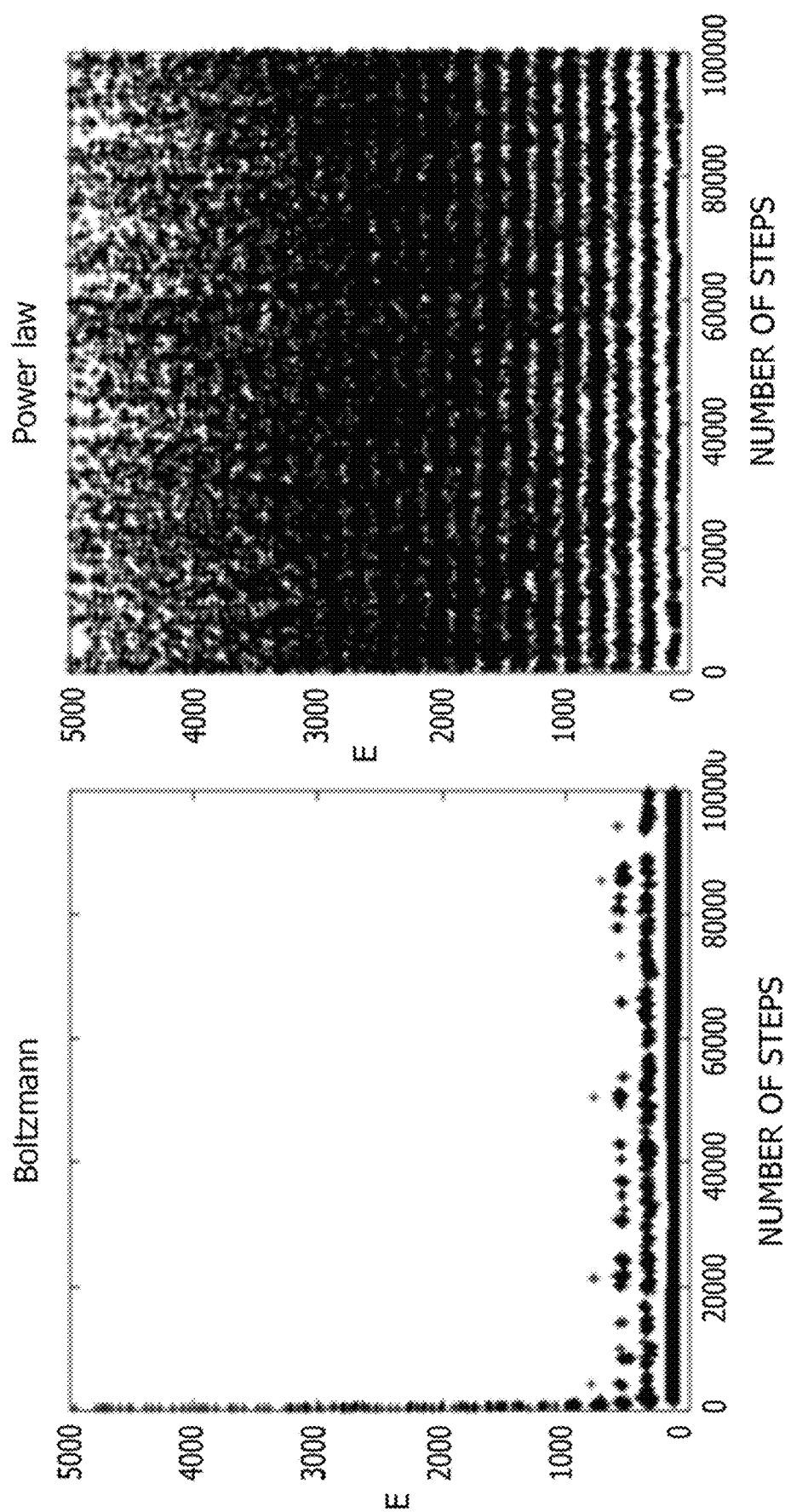
FIG. 26 is a diagram illustrating an example of calculation results of the replica exchange method when the Boltzmann distribution and the power law-type transition probability distribution are used.
Figure 27:
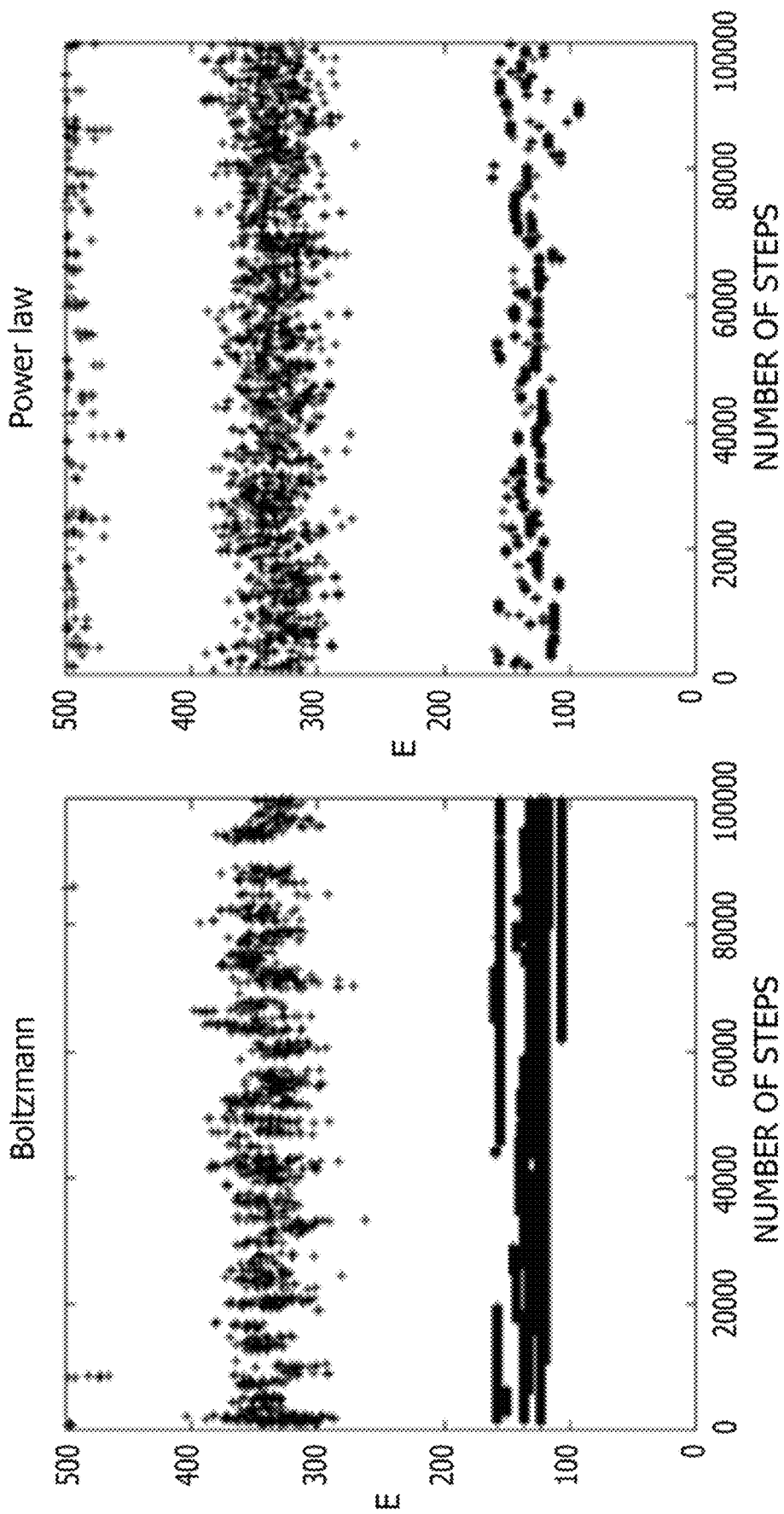
FIG. 27 is an enlarged view of regions where energy is small in the calculation results of FIG. 26.

FIG. 26 is a diagram illustrating an example of calculation results of the replica exchange method when the Boltzmann distribution and the power law-type transition probability distribution are used. Furthermore, FIG. 27 is an enlarged view of regions where the energy is small in the calculation results of FIG. 26. In FIGS. 26 and 27, the horizontal axis represents the number of steps, and the vertical axis represents energy (E).

As can be seen from FIG. 26, it can be seen that when the Boltzmann distribution is used (left), energy is captured by a specific local minimum, but when the power law-type transition probability distribution is used (right), energy can easily escape when the energy falls into a specific local minimum. Furthermore, an energy region where sampling can be performed is wider when the power law-type transition probability distribution is used than when the Boltzmann distribution is used.

Moreover, as can be seen from FIG. 27, the minimum value of energy obtained is smaller when the power law-type transition probability distribution is used than when the Boltzmann distribution is used. Therefore, minimum value search performance is more excellent when the power law-type transition probability distribution is used than when the Boltzmann distribution is used. This is because when the power law-type transition probability distribution is used, since it has relatively large transition probability even when an energy difference is large, the exchange probability can be earned even if temperature setting is coarse, which is different from when the Boltzmann distribution is used.

Figure 28:
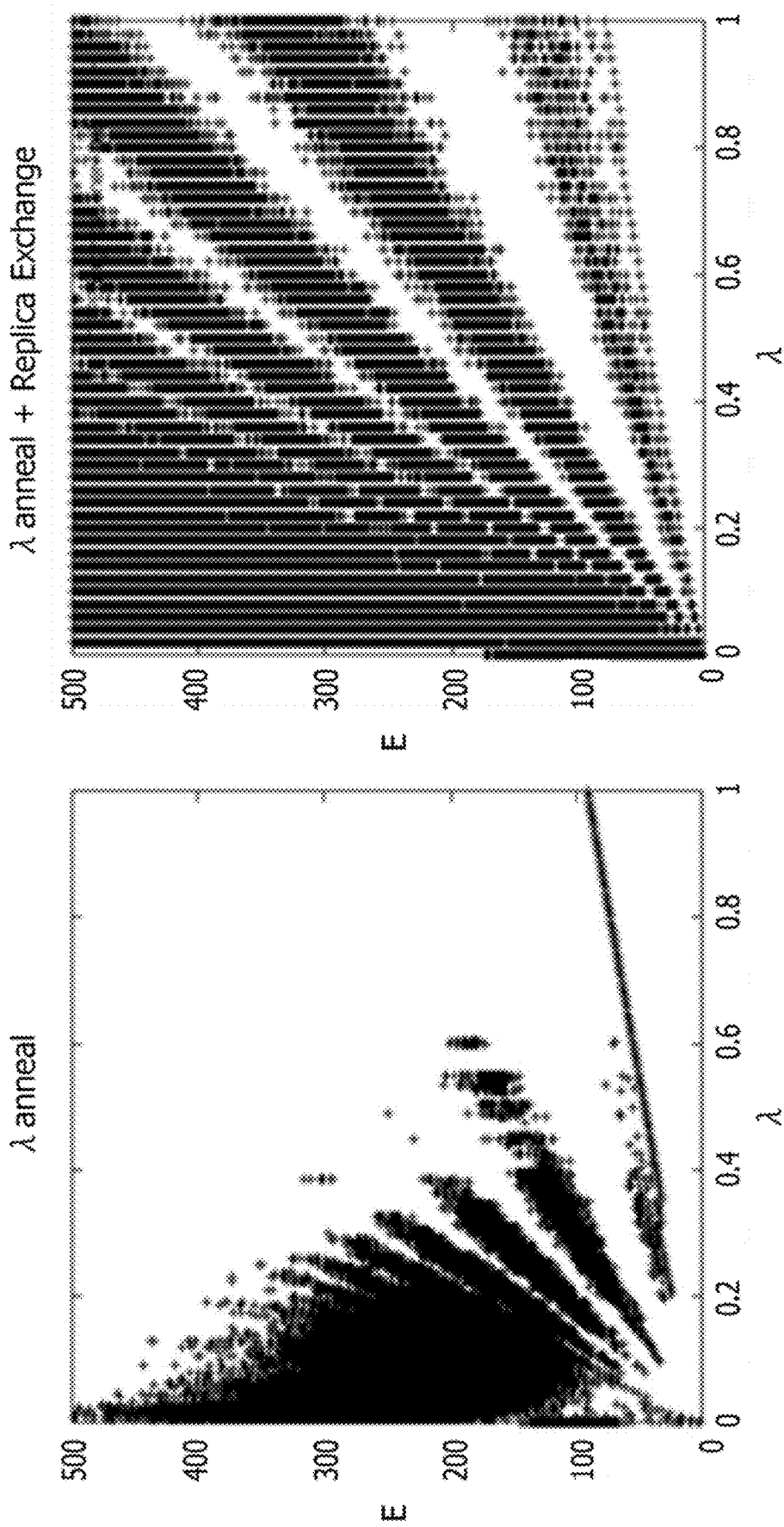
FIG. 28 is a diagram illustrating an example of calculation results of the λ annealing method.

FIG. 28 is a diagram illustrating an example of calculation results of the λ annealing method. The left diagram in FIG. 28 illustrates a calculation result in a case of the λ annealing method alone, and the right diagram illustrates a calculation result in a case of combining the λ annealing method with the replica exchange method. The horizontal axis represents A, and the vertical axis represents energy (E) (=H(λ)).

The traveling salesman problem used is ulysees16 as above, and calculation conditions are: $k_1$ and $k_2$ of equation (23)=150, $N_E$=200,000 (for every replica in a case of the replica exchange method), $N_f$=10, $m_1$ in equation (14) is 1.02. As for the temperature, T=1.0 is set in the case of the λ annealing method alone, and T=1.0, 3.0, 5.0, 10.0, 15.0, 20.0, 25.0, 30.0 are set to the eight replicas in the case of combining with the replica exchange method.

Annealing about λ is guaranteed to obtain aground state by sufficiently gradually increasing λ little by little in a case of an Ising-type quantum computer. However, the optimization device 20 that does not handle the quantum theory and obtains a minimum value of energy within the range of the classical Hamiltonian is not guaranteed to obtain that because there is no quantum effect. In the example of the left diagram of FIG. 28, sampling efficiency is degraded as λ increases. However, by combining the λ annealing method and the replica exchange method as illustrated in the right diagram of FIG. 28, sampling efficiency can be improved. Consequently, it is possible to efficiently heuristically solve a minimum value.

Figure 29:
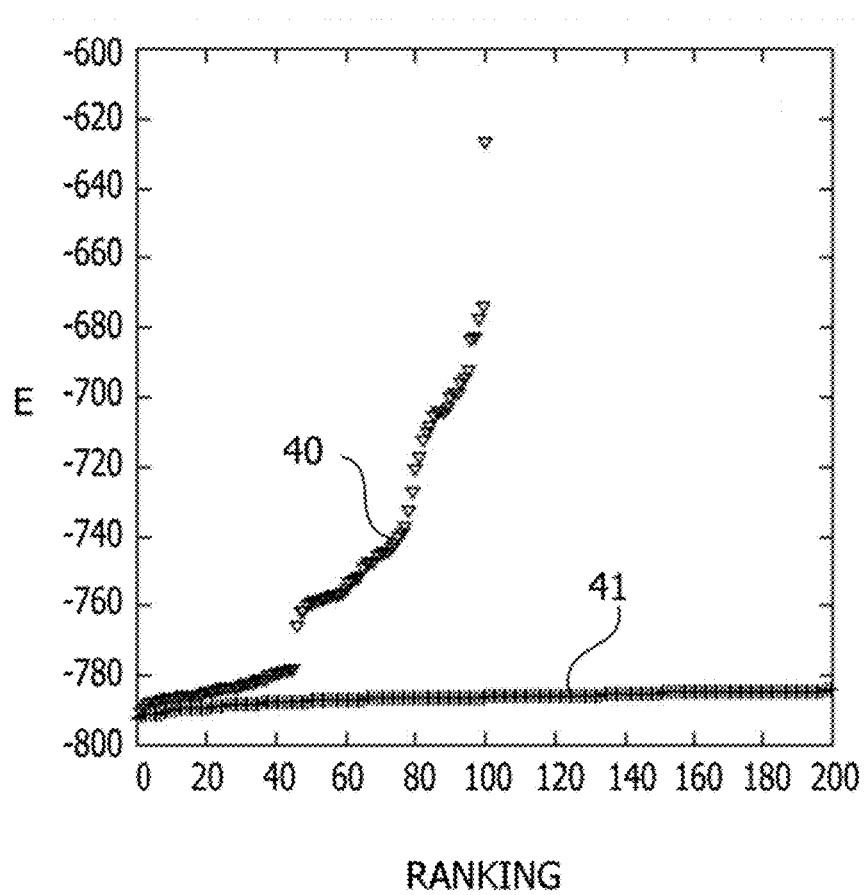
FIG. 29 is a diagram illustrating an example of comparing a calculation result by a device that performs a parallel trial using a digital circuit with a calculation result by the optimization device of the second embodiment.

FIG. 29 is a diagram illustrating an example of comparing a calculation result by a device that performs a parallel trial using a digital circuit with a calculation result by the optimization device of the second embodiment. The horizontal axis represents a ranking indicating an ascending order of energy, and the vertical axis represents energy (E).

The problem to be calculated is ulysees16 as above, and $k_1$ and $k_2$ in equation (23) are 150.

A calculation result 40 is, for example, a calculation result when using a device that performs parallel trial using a digital circuit disclosed in Non Patent Literature 1 (the SA method and the dynamic offset method are applied). The number of trials (corresponding to $N_E$ described above) is 200 million times.

A calculation result 41 is a calculation result when the optimization device 20 of the second embodiment is used. Note that the calculation result 41 indicates a calculation result when the annealing process and the replica exchange process described in the process flow illustrated in FIG. 5 are not performed. $N_E$=200,000, and $N_f$=10. In the optimization device 20, the dock frequency of the CPU 21 used is 2.60 GHz, and the capacity of the RAM 22 is 12288 MB. Note that the program is implemented in C++ and is not parallelized by OpenMP or Message Passing Interface (MPI), but calculation by one CPU core is performed.

As illustrated in FIG. 29, when the optimization device 20 is used, a smaller minimum value is obtained and calculation accuracy is superior to when the device that performs the parallel trial using the digital circuit is used. Furthermore, the calculation time is 13.5 seconds in the former case and 1.6 seconds in the latter case, and the latter is also superior in calculation speed.

Next, a calculation example when energy is represented by a continuous function will be described.

The energy function used is represented by the following equation (24) described in Non Patent Literature 3.

$$E(\{x\}) = \sum_{i=1}^{4}(x_i^2-8)^2 + 5\sum_{i=1}^{4}x_i + E_0 \qquad (24)$$

This energy function is a function that takes a minimum value 0 when $E_0 \approx 57.3276$. In equation (24), a defining region of $x_i$ (state variable) is an arbitrary real number. Also for the energy function defined by such real numbers, search for the minimum value of the energy function can be efficiently performed by performing the MCMC calculation using equation (9) using the power law-type transition probability distribution represented by equation (14).

Figure 30:
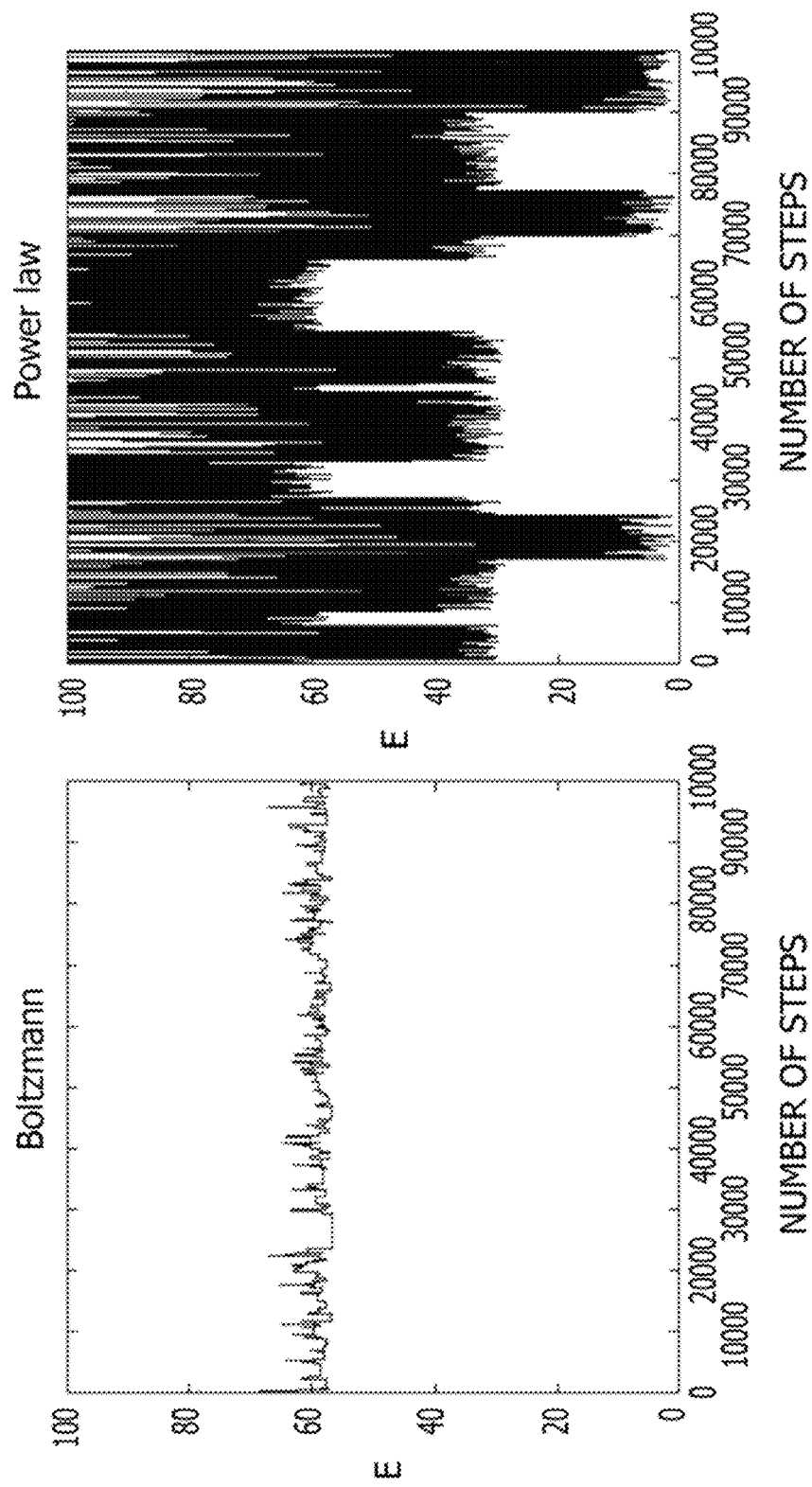
FIG. 30 is a diagram illustrating an example of comparing search performance for an energy function that is a continuous function.

FIG. 30 is a diagram illustrating an example of comparing search performance for an energy function that is a continuous function. The horizontal axis represents the number of steps, and the vertical axis represents energy (E) (the value of the energy function of equation (24)). FIG. 30 illustrates a sampling result when the Boltzmann distribution is used as the transition probability distribution (left) and a sampling result when the power law transition probability distribution is used (right).

The calculation conditions are: T=1.0, $N_E$=100,000, $N_t$=10, and $m_1$ in equation (14) is 1.02.

As is clear from FIG. 30, when the Boltzmann distribution is the transition probability distribution, once a solution falls into a local minimum, the solution does not come out of the local minimum. On the other hand, it is clear from FIG. 30 that when the power law-type transition probability distribution is used, it is possible to escape from the local minimum. Furthermore, when the power law-type transition probability distribution is used, as is clear from FIG. 30, a large number of states such as staying in the same state a fixed number of times can be obtained with a small number of calculations. For example, since a large number of local minima are obtained, an efficient solution candidate can be obtained in a system in which a local minimum has an important meaning besides a minimum value. Representative examples of such systems include organic compounds and biomolecules.

Modification Examples

In the above description, the processing unit 31 illustrated in FIG. 4 has been described as being implementable using a program module executed by the CPU 21, but each unit of the processing unit 31 may be implemented by an electronic circuit for a specific use such as an ASIC or an FPGA.

For example, the Hamiltonian calculation unit 31d may calculate equation (1) using a product-sum operation circuit. The MCMC calculation execution unit 31h may also be implemented using a comparison circuit that compares uniform random numbers with f(ΔE) as those represented in equations (14) to (16). Moreover, the energy difference calculation unit 31e may be implemented by an electronic circuit that calculates an energy difference due to a change in value of each state variable in parallel as described in Non Patent Literature 1 or the like. Although the optimization device 20 can allow a solution to escape from a local minimum with high efficiency by using a transition probability distribution different from the Boltzmann distribution as described above, using the electronic circuit as described above as an accelerator can facilitate escape when the solution falls into a deep local minimum. For the same reason, a GPGPU or the like may be used as an accelerator to execute the processing of each unit of the processing unit 31.

Note that further improvement in performance is expected by performing parallelization using OpenMP or MPI, or performing specialized tuning for a specific CPU instruction set such as Advanced Vector eXtensions (AVX) 256 or AVX-512.

Note that in the above description, the traveling salesman problem has been described as an example of a problem to be calculated, but the present embodiment may be applied to problems in other fields such as financial engineering. Furthermore, since a job scheduling problem can be formulated using the Ising model, the present embodiment may be applied to various schedule optimization problems (for example, a problem of optimizing a schedule of persons concerned in a hospital or the like). Moreover, also in the deep learning field, since a restricted Boltzmann machine can be formulated using the Ising model, the present embodiment may be used for optimization of the restricted Boltzmann machine. Thus, the present embodiment may be applied to the field of artificial intelligence.

Furthermore, other than the search for a minimum value of the Ising-type evaluation function, the present embodiment may be applied to the search for a minimum value of an evaluation function in which state variables are continuous variables, and thus the problem to be calculated is not limited to the above-described field.

Furthermore, although a minimum value of the evaluation function is searched for in the above description, the present embodiment may be extended to a method of searching for a maximum value of the evaluation function by inverting the sign of the evaluation function.

Note that as described above, the above processing contents may be implemented by causing the optimization device 20 to execute a program.

The program may be recorded on a computer-readable recording medium (for example, the recording medium 26a). As the recording medium, for example, a magnetic disk, an optical disk, a magneto-optical disk, a semiconductor memory, or the like may be used. Examples of the magnetic disk include an FD and an HDD. Examples of the optical disc include a CD, a CD-R (Recordable)/RW (Rewritable), a DVD, and a DVD-R/RW. The program may be recorded on a portable recording medium and distributed. In this case, the program may be copied from the portable recording medium to another recording medium (for example, the HDD 23) and then executed.

In the foregoing, one aspect of the optimization device, the method for controlling the optimization device, and the program for controlling the optimization device of the present embodiment has been described on the basis of the embodiments; however, these are only examples and are not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
a memory configured to store setting information indicating an optimization method to be used, the memory being configured to store a value of a state variable included in an evaluation function, the evaluation function being obtained by converting a problem; and
a processor circuit coupled to the memory, the processor circuit being configured to
select, based on the setting information stored in the memory, the optimization method to be used from among a plurality of optimization methods including a simulated annealing (SA) method and a replica exchange method,
perform, in the processor circuit, the selected optimization method on the evaluation function by repeating a process of updating the value of the state variable by the selected optimization method, the updating of the value of state variable being performed in accordance with a first transition probability distribution that is represented by a first function, the first function being a function configured to normalize to one a sum of probabilities of transition from a current state to each of a plurality of different states, the current state being represented by a current value of the state variable, the first transition probability distribution having a feature that a transition probability in the first transition probability distribution is larger than a transition probability in a Boltzmann distribution as a change in the value of the evaluation function due to a change in the value of the state variable is positively larger.

2. The optimization device according to claim 1, wherein the first transition probability distribution is a transition probability distribution represented by a reciprocal of an m-th power (m>1) of a value that is obtained by adding one to a product of a change in a value of the evaluation function and an inverse temperature.

3. The optimization device according to claim 1, wherein the first transition probability distribution is a transition probability distribution represented by a reciprocal of a (m/2)th power (m>1) of a value that is obtained by adding one to a square of a product of a change in a value of the evaluation function and an inverse temperature.

4. The optimization device according to claim 1, wherein the first transition probability distribution is a transition probability distribution represented by an exponential function of a value obtained by multiplying by minus one an m-th power (m>0, where m≠1) of a product of a change in a value of the evaluation function and an inverse temperature.

5. The optimization device according to claim 1, wherein the processor is configured to
calculate a value of the evaluation function each time the value of the state variable is updated, and
store a plurality of values in the memory in ascending order among calculated values of the evaluation function.

6. The optimization device according to claim 1, wherein the processor is configured to output a value of the evaluation function at a predetermined sampling frequency.

7. The optimization device according to claim 1,
wherein the processor is configured to
calculate, for each of a plurality of annealing variables, a second Hamiltonian represented by a sum of a first product and a second product, the first product being a value obtained by multiplying a known first Hamiltonian with a first value, the first value being a value obtained by subtracting a value of the annealing variable from one, the second product being a value obtained by multiplying a value of the evaluation function with the each of the plurality of annealing variables, and
output a calculation result of the calculating.

8. The optimization device according to claim 7,
wherein the processor is configured to select the predetermined schedule from a plurality of schedules of increasing the annealing variable from zero to one.

9. The optimization device according to claim 1,
wherein the processor is further configured to perform a search for the minimum value by a replica exchange method, the replica exchange method including:
setting a different value of a temperature parameter for each of a plurality of replicas; and
exchanging values of the temperature parameter among the plurality of replicas according to the set value of the temperature parameter and an exchange probability based on the transition probability distribution.

10. The optimization device according to claim 1,
wherein the processor is configured to:
change the value of the parameter included in the transition probability distribution;
calculate an evaluation value with respect to a value of the evaluation function at a value of each parameter in a calculation time shorter than a calculation time when search for the minimum value of the evaluation function is performed; and
output a calculation result.

11. A method implemented by a computer for controlling an optimization processing, the method comprising:
obtaining, by a processor circuit of the computer, from a memory, setting information indicating an optimization method to be used, the memory being configured to store a value of a state variable included in an evaluation function obtained by converting a problem stored in the memory;
selecting, by the processor circuit of the computer, based on the setting information stored in the memory, the optimization method to be used from among a plurality of optimization methods including a simulated annealing (SA) method and a replica exchange method; and
performing, by the processor circuit of the computer, the selected optimization method on the evaluation function by repeating a process of updating the value of the state variable by the selected optimization method, the updating of the value of state variable being performed in accordance with a first transition probability distribution that is represented by a first function, the first function being a function configured to normalize to one a sum of probabilities of transition from a current state to each of a plurality of different states, the current state being represented by a current value of the state variable, the first transition probability distribution having a feature that a transition probability in the first transition probability distribution is larger than a transition probability in a Boltzmann distribution as a change in the value of the evaluation function due to a change in the value of the state variable is positively larger.

12. A non-transitory computer-readable storage medium for storing a program for controlling an optimization processing, the program being configured to cause a processor circuit to perform processing, the processing comprising:
obtaining, by the processor circuit, from a memory, setting information indicating an optimization method to be used, the memory being configured to store a value of a state variable included in an evaluation function obtained by converting a problem stored in a memory; and
selecting, by the processor circuit of the computer, based on the setting information stored in the memory, the optimization method to be used from among a plurality of optimization methods including a simulated annealing (SA) method and a replica exchange method; and
performing, by the processor circuit of the computer, the selected optimization method on the evaluation function by repeating a process of updating the value of the state variable by the selected optimization method, the updating of the value of state variable being performed in accordance with a first transition probability distribution that is represented by a first function, the first function being a function configured to normalize to one a sum of probabilities of transition from a current state to each of a plurality of different states, the current state being represented by a current value of the state variable, the first transition probability distribution having a feature that a transition probability in the first transition probability distribution is larger than a transition probability in a Boltzmann distribution as a change in the value of the evaluation function due to a change in the value of the state variable is positively larger.

* * * * *